(12) United States Patent
Ichida et al.

(10) Patent No.: US 7,306,531 B2
(45) Date of Patent: Dec. 11, 2007

(54) ELECTRIC BICYCLE DERAILLEUR

(75) Inventors: Tadashi Ichida, Nara (JP); Ryuichiro Takamoto, Osaka (JP); Haruyuki Takebayashi, Osaka (JP); Koji Uno, Osaka (JP)

(73) Assignee: Shimano Inc., Osaka (JP)

( * ) Notice: Subject to any disclaimer, the term of this patent is extended or adjusted under 35 U.S.C. 154(b) by 733 days.

(21) Appl. No.: 10/830,461

(22) Filed: Apr. 23, 2004

(65) Prior Publication Data

US 2005/0239587 A1  Oct. 27, 2005

(51) Int. Cl.
*F16H 61/02* (2006.01)
*F16H 63/50* (2006.01)
*B62M 9/12* (2006.01)

(52) U.S. Cl. ......................... 474/70; 474/80

(58) Field of Classification Search ............ 474/78–82, 474/70; 74/500.5, 502.2; 701/51; 475/149; 280/236, 238
See application file for complete search history.

(56) References Cited

U.S. PATENT DOCUMENTS

| | | | | |
|---|---|---|---|---|
| 4,143,557 A * | 3/1979 | Wakebe et al. | ............... | 474/80 |
| 4,490,127 A * | 12/1984 | Matsumoto et al. | ........ | 474/110 |
| 4,605,240 A * | 8/1986 | Clem et al. | ................... | 474/70 |
| 4,946,425 A * | 8/1990 | Buhlmann | ................... | 474/80 |
| 5,025,563 A * | 6/1991 | Rennerfelt | .................... | 33/1 N |
| 5,059,158 A | 10/1991 | Bellio et al. | | |
| 5,213,548 A | 5/1993 | Colbert et al. | | |
| 5,356,348 A | 10/1994 | Bellio et al. | | |
| 5,357,177 A | 10/1994 | Fey et al. | | |
| 5,470,277 A * | 11/1995 | Romano | ...................... | 474/70 |
| 5,480,356 A * | 1/1996 | Campagnolo | ................ | 474/70 |
| 5,518,456 A | 5/1996 | Kojima et al. | | |
| 5,551,315 A * | 9/1996 | Pikoulas | .................... | 74/502.2 |
| 5,653,649 A * | 8/1997 | Watarai | ....................... | 474/78 |
| 5,860,880 A | 1/1999 | Oka | | |
| 5,873,283 A | 2/1999 | Chen et al. | | |
| 6,047,230 A * | 4/2000 | Spencer et al. | ............... | 701/57 |
| 6,282,976 B1 | 9/2001 | Jordan et al. | | |
| 6,619,154 B2 | 9/2003 | Campagnolo | | |
| 6,623,389 B1* | 9/2003 | Campagnolo | ................ | 474/70 |
| 6,648,782 B2 | 11/2003 | Valle | | |
| 6,676,554 B2 * | 1/2004 | Dal Pra' | .................... | 475/149 |

(Continued)

FOREIGN PATENT DOCUMENTS

DE  4340471 C1 *  2/1995

(Continued)

*Primary Examiner*—Marcus Charles
(74) *Attorney, Agent, or Firm*—Global IP Counselors, LLP

(57) ABSTRACT

An electric derailleur has a motor unit having a derailleur motor with an output shaft, a position control mechanism and a controller. The output shaft is rotated through a moveable range including a first derailleur shift position and a second derailleur shift position. The position control mechanism is configured and arranged to provide a position signal indicative of an angular position of the output shaft. The controller detects a predetermined lockup position of the derailleur motor occurring at one of the first and second derailleur shift positions. The controller also sets a predetermined stop position for the derailleur motor that is calculated distance prior to the lockup position based on the position signal of the position control mechanism. Thus, the derailleur motor can be calibrated such that a new stop position is set that prevents an overcurrent from occurring in the motor.

22 Claims, 41 Drawing Sheets

U.S. PATENT DOCUMENTS 6,679,797 B2  1/2004  Valle
2003/0092519 A1  5/2003  Fukuda

FOREIGN PATENT DOCUMENTS

EP  1357023 A1 * 10/2003
JP  07251784 A * 10/1995
JP  2000095181 A * 4/2000
JP  2003320987 A * 11/2003

* cited by examiner

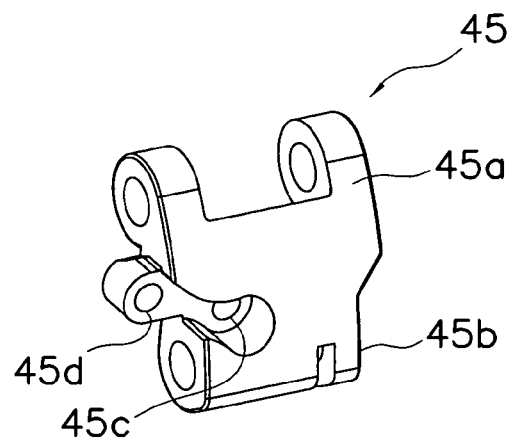
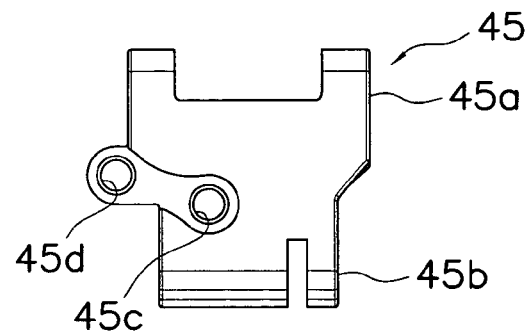
Fig. 18              Fig. 19
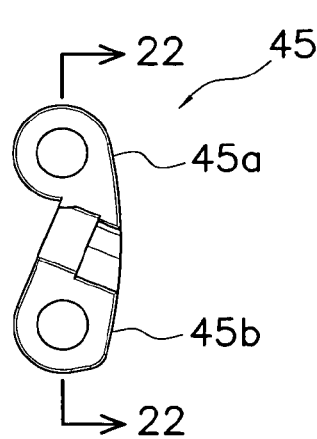
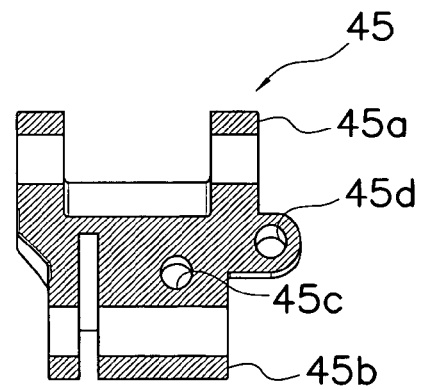
Fig. 20              Fig. 21

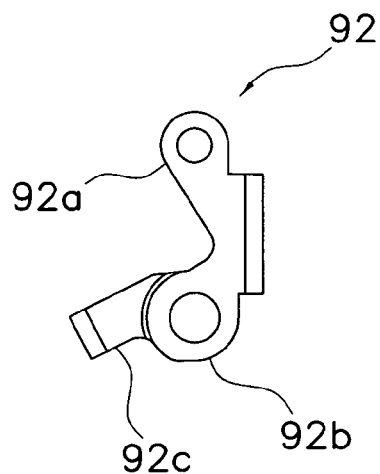 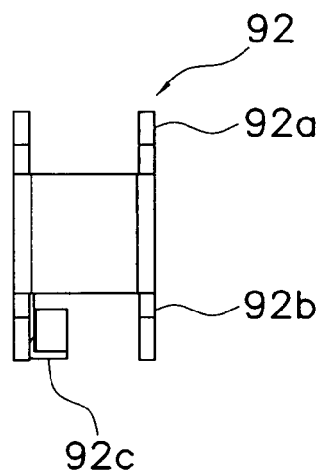 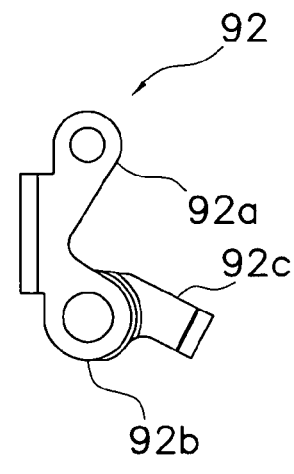
Fig. 25    Fig. 26    Fig. 27
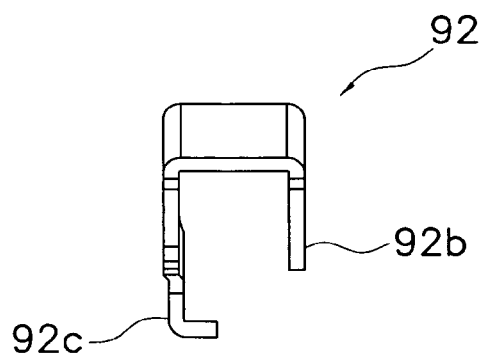
Fig. 28

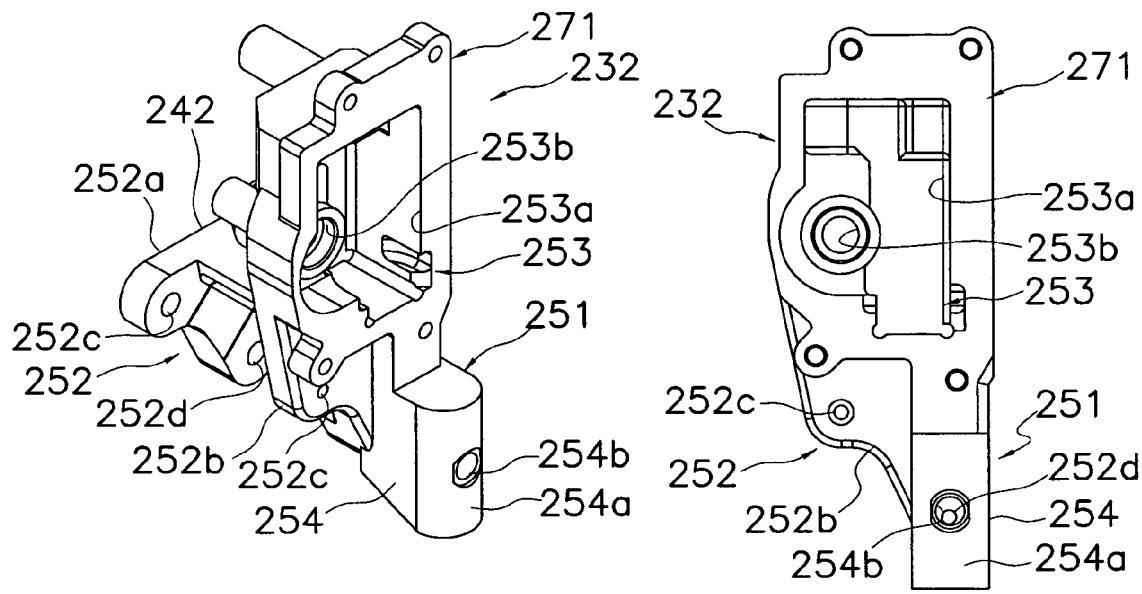
Fig. 52
Fig. 53
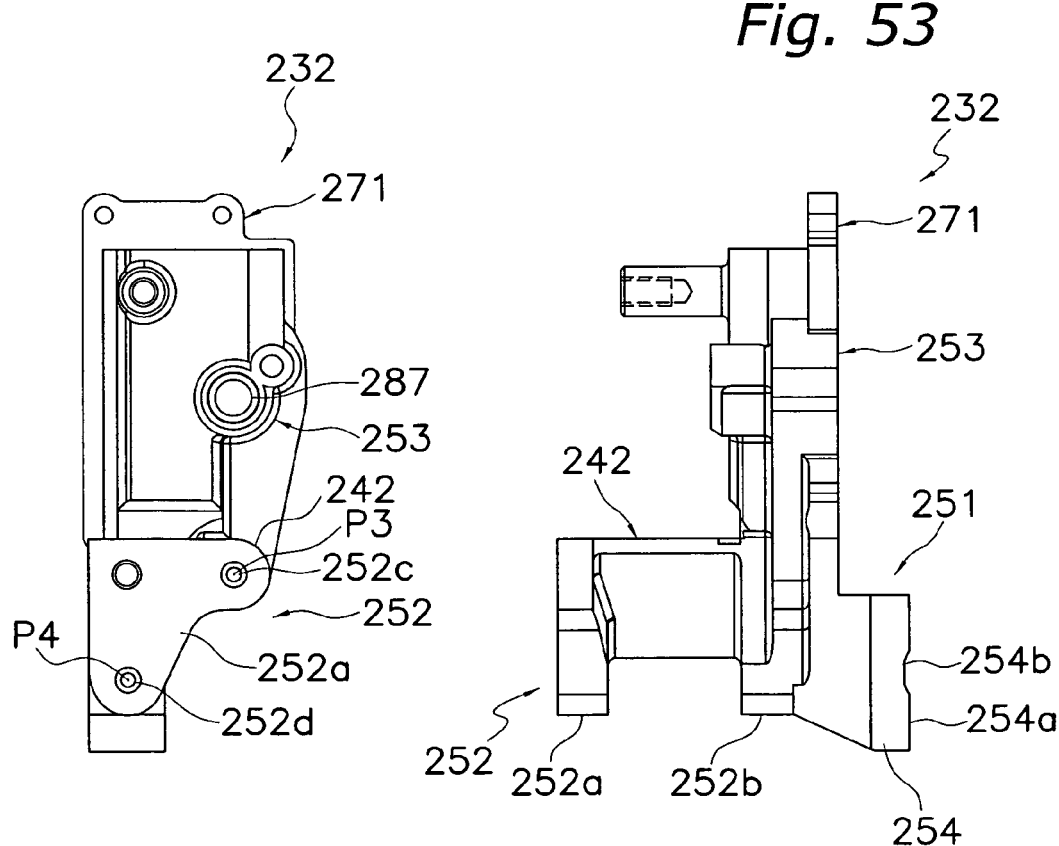
Fig. 54
Fig. 55

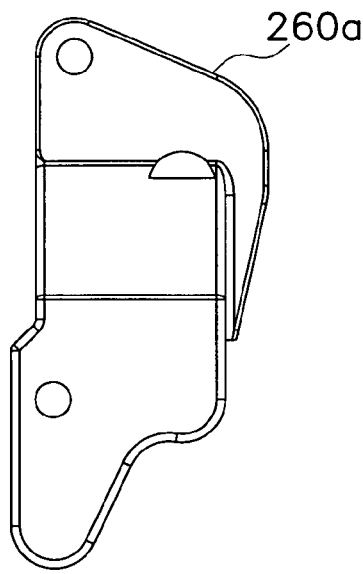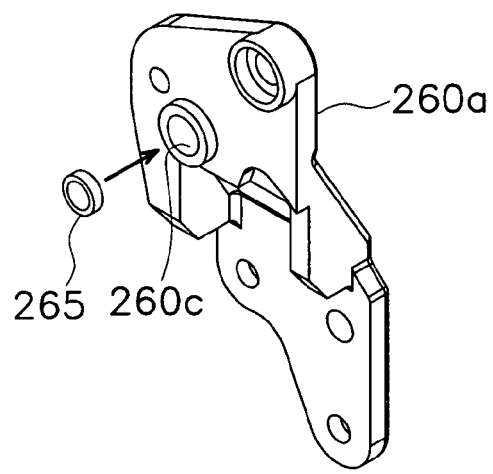
Fig. 56              Fig. 57
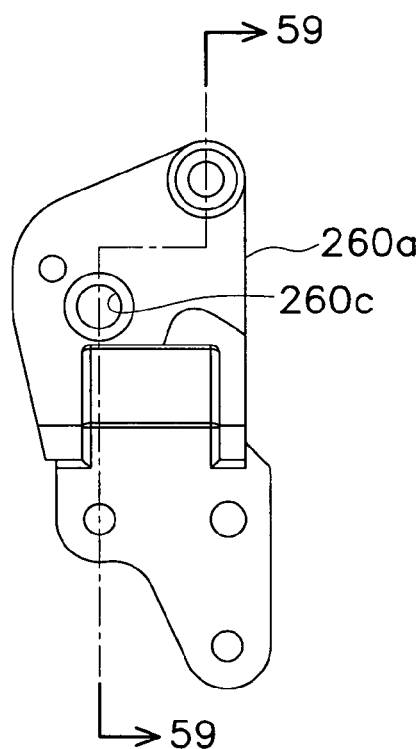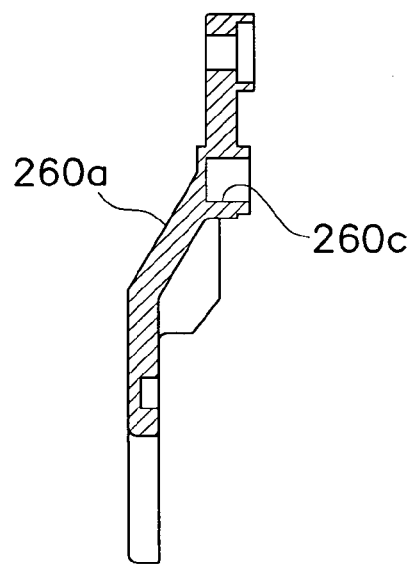
Fig. 58              Fig. 59

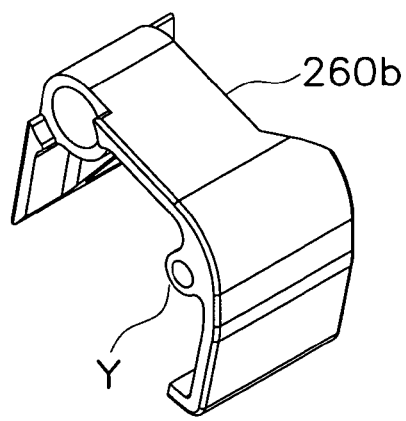
Fig. 60
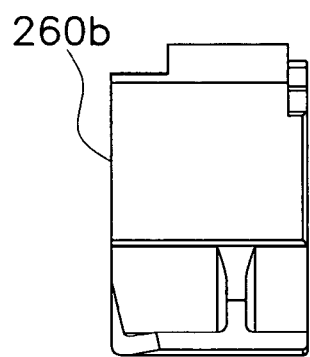 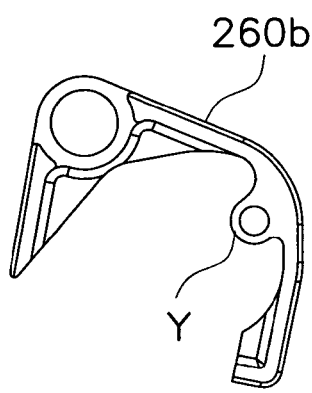 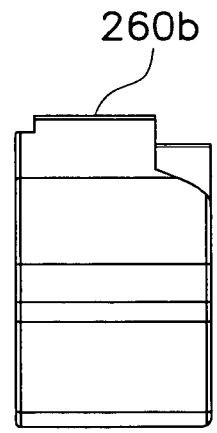
Fig. 61    Fig. 62    Fig. 63
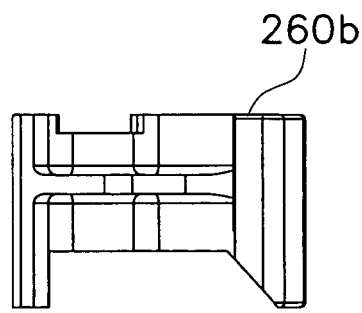
Fig. 64

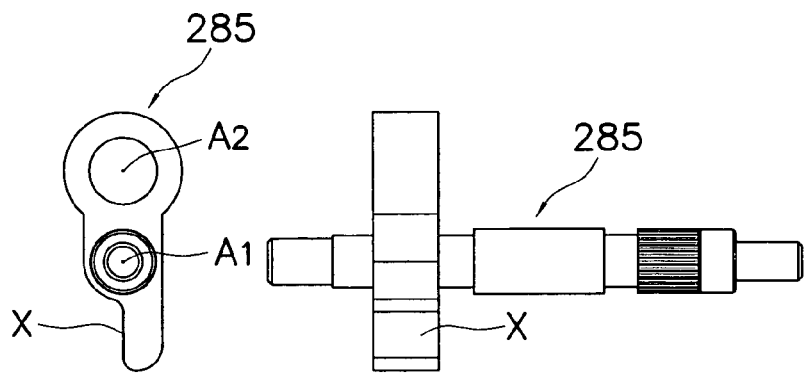
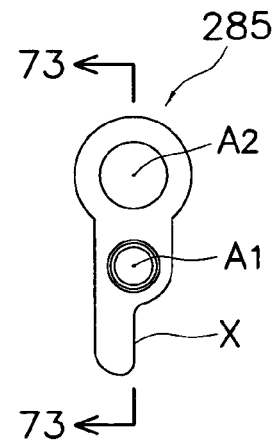
Fig. 70          Fig. 71          Fig. 72
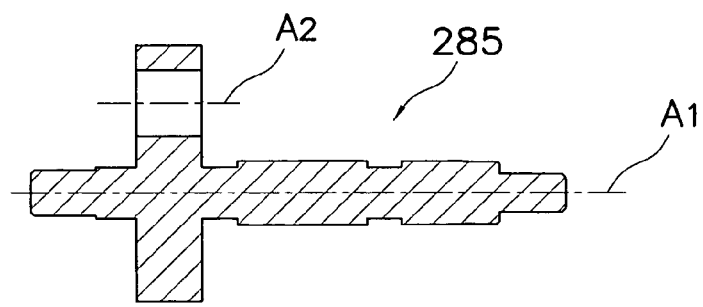
Fig. 73

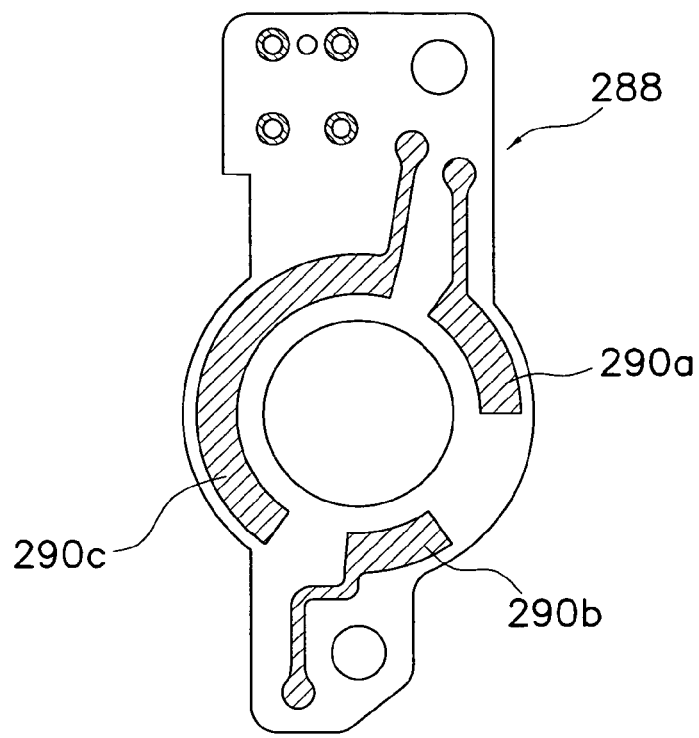
Fig. 80
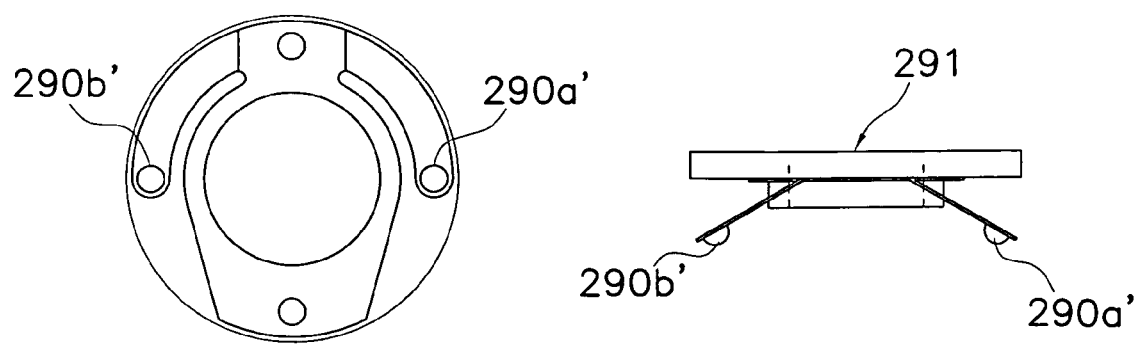
Fig. 81
Fig. 82

ELECTRIC BICYCLE DERAILLEUR

BACKGROUND OF THE INVENTION

1. Field of the Invention

This invention generally relates to an electric derailleur motor unit for an electric bicycle derailleur. More specifically, the present invention relates to calibrating a motor that moves a derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, the bicycle transmission has been significantly changed over the years.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleur transmissions were manually controlled by a hand operated actuator such as a lever or twist-grip attached to the bicycle handlebar, wherein the derailleur is connected to the actuator by a Bowden cable.

Recently, bicycles have been equipped with electrical components to make riding easier and more enjoyable for the rider. Some bicycles are equipped with automatic shifting units that are automatically adjusted according to the riding conditions by a cycle computer or control unit. In particular, the front and rear derailleurs have recently been automated. Recently, various electronic devices have been used to determine one or more operating parameters of the derailleur. Such parameters may be used for informational purposes or for electronically controlling the derailleur. A common operating parameter is the position of the derailleur relative to the plurality of sprockets. In the past, potentiometers that cooperated with various moving components of the derailleur were used to ascertain the position of the derailleur. Since derailleurs usually have a relatively small range of motion, high precision potentiometers were required for this purpose. That was especially true when the information provided by the potentiometer is used by an electronic device to shift the chain among the plurality of sprockets. Unfortunately, high precision potentiometers are relatively expensive, thus making electronically controlled derailleurs using high precision potentiometers unsuitable for mass production. Inexpensive potentiometers have non-linear characteristics, and such characteristics vary from one potentiometer to another. Thus, the actual derailleur position is difficult to ascertain with such potentiometers, and the unpredictability from one potentiometer to another also makes derailleurs using such potentiometers unsuitable for mass production.

Generally speaking, the front derailleur is typically secured to the seat tube of the bicycle frame or the bottom bracket. Basically, a front derailleur includes a fixed or base member non-movably secured to a bicycle frame, and a movable member supported to be movable relative to the fixed member. Typically, the fixed member is a tubular clamping member that is secured to the seat tube. The movable member typically has a chain guide with a pair of cage plates for contacting and moving a chain between the front sprockets. The movable member is usually biased in a given direction relative to the fixed member by a spring. The movable member is usually moved relative to the fixed member by pulling and/or releasing a shift control cable that is coupled to the front derailleur. The movable member and the fixed member usually are interconnected through pivotal links. In a motorized front derailleur, the motor is used to pull and release a control cable or the motor is connected by a drive train to the front derailleur.

It will be apparent to those skilled in the art from this disclosure that there exists a need for an improved electric bicycle derailleur. This invention addresses this need in the art as well as other needs, which will become apparent to those skilled in the art from this disclosure.

SUMMARY OF THE INVENTION

One object of the present invention is to provide an electric derailleur motor unit that can be easily calibrated to avoid excessive use of electrical energy.

Another object of the present invention is to provide an electric derailleur motor unit that is durable.

Another object of the present invention is to provide an electric derailleur motor unit that is relatively simple and inexpensive to manufacture and assemble.

The foregoing objects can basically be attained by providing an electric derailleur motor unit comprising a derailleur motor, an output shaft, a position control mechanism and a controller. The output shaft is operatively coupled to the derailleur motor to rotate through a moveable range including a first derailleur shift position and a second derailleur shift position. The position control mechanism is configured and arranged to provide a position signal indicative of an angular position of the output shaft. The controller is operatively coupled to the derailleur motor and the position control mechanism. The controller is configured to detect a predetermined lockup position of the derailleur motor occurring at one of the first and second derailleur shift positions. The controller is further configured to set a predetermined stop position for the derailleur motor that is calculated distance prior to the lockup position based on the position signal of the position control mechanism.

The foregoing objects can basically be attained by performing a method of calibrating a derailleur motor of an electric derailleur, comprising the steps of: supplying current to the derailleur motor to rotate an output shaft to a lockup position; determining the lockup position of the derailleur motor; determining an angular range of the output shaft prior to the lockup position that corresponds to an end gear position of a derailleur moving member; and setting a stop position for the derailleur motor within the angular range of the output shaft that is calculated distance prior to the lockup position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 18 is a side perspective view of the right or outer link for the front derailleur illustrated in FIGS. 1-6 in accordance with the present invention;

FIG. 19 is a right side elevational view of the right link illustrated in FIG. 18;

FIG. 20 is a rear side elevational view of the right link illustrated in FIGS. 18 and 19;

FIG. 21 is a cross-sectional view of the right link illustrated in FIGS. 19-21 as seen along section line 21-21 of FIG. 20;

FIG. 25 is a side elevational view of a saver link for the front derailleur illustrated in FIGS. 1-6 in accordance with the present invention;

FIG. 26 is a side elevational view of the saver link illustrated in FIG. 25;

FIG. 27 is an inside elevational view of the saver link illustrated in FIGS. 25 and 26;

FIG. 28 is a bottom elevational view of the saver link illustrated in FIGS. 25-27 in accordance with the present invention;

FIG. 52 is a front perspective view of the motorized front derailleur mounting member for the front derailleur illustrated in FIGS. 48-51 in accordance with the second embodiment of the present invention;

FIG. 53 is a front elevational view of the motorized front derailleur mounting member illustrated in FIG. 52;

FIG. 54 is a rear elevational view of the motorized front derailleur mounting member illustrated in FIGS. 52 and 53;

FIG. 55 is a right side elevational view of the motorized front derailleur mounting member illustrated in FIGS. 52-54;

FIG. 56 is a rear elevational view of the back cover for the motorized front derailleur illustrated in FIGS. 48-51 in accordance with the second embodiment of the present invention;

FIG. 57 is a rear perspective view of the back cover illustrated in FIG. 56 in accordance with the second embodiment of the present invention;

FIG. 58 is a front elevational view of the back cover illustrated in FIGS. 56 and 57 in accordance with the second embodiment of the present invention;

FIG. 59 is a cross-sectional view of the back cover illustrated in FIGS. 56 and 57 as seen along section line 59-59 of FIG. 58;

FIG. 60 is a rear perspective view of the intermediate cover for the motorized front derailleur illustrated in FIGS. 48-51 in accordance with the second embodiment of the present invention;

FIG. 61 is a left side elevational view of the intermediate cover illustrated in FIG. 60 in accordance with the second embodiment of the present invention;

FIG. 62 is a rear elevational view of the intermediate cover illustrated in FIGS. 60 and 61 in accordance with the second embodiment of the present invention;

FIG. 63 is a right side elevational view of the intermediate cover illustrated in FIGS. 60-62 in accordance with the second embodiment of the present invention;

FIG. 64 is a bottom plan view of the intermediate cover illustrated in FIGS. 60-62 in accordance with the second embodiment of the present invention;

FIG. 70 is a rear elevational view of the output shaft in accordance with the second embodiment of the present invention;

FIG. 71 is a right side elevational view of the output shaft in accordance with the second embodiment of the present invention;

FIG. 72 is a front elevational view of the output shaft in accordance with the second embodiment of the present invention;

FIG. 73 is a cross sectional view of the output shaft in accordance with the second embodiment of the present invention as seen along section line 73-73 of FIG. 72;

FIG. 80 is a rear elevational view of the printed circuit board in accordance with the second embodiment of the present invention;

FIG. 81 is an axial elevational view of the top-low brush sensor in accordance with the second embodiment of the present invention; and FIG. 82 is a side elevational view of the top-low brush sensor in accordance with the second embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
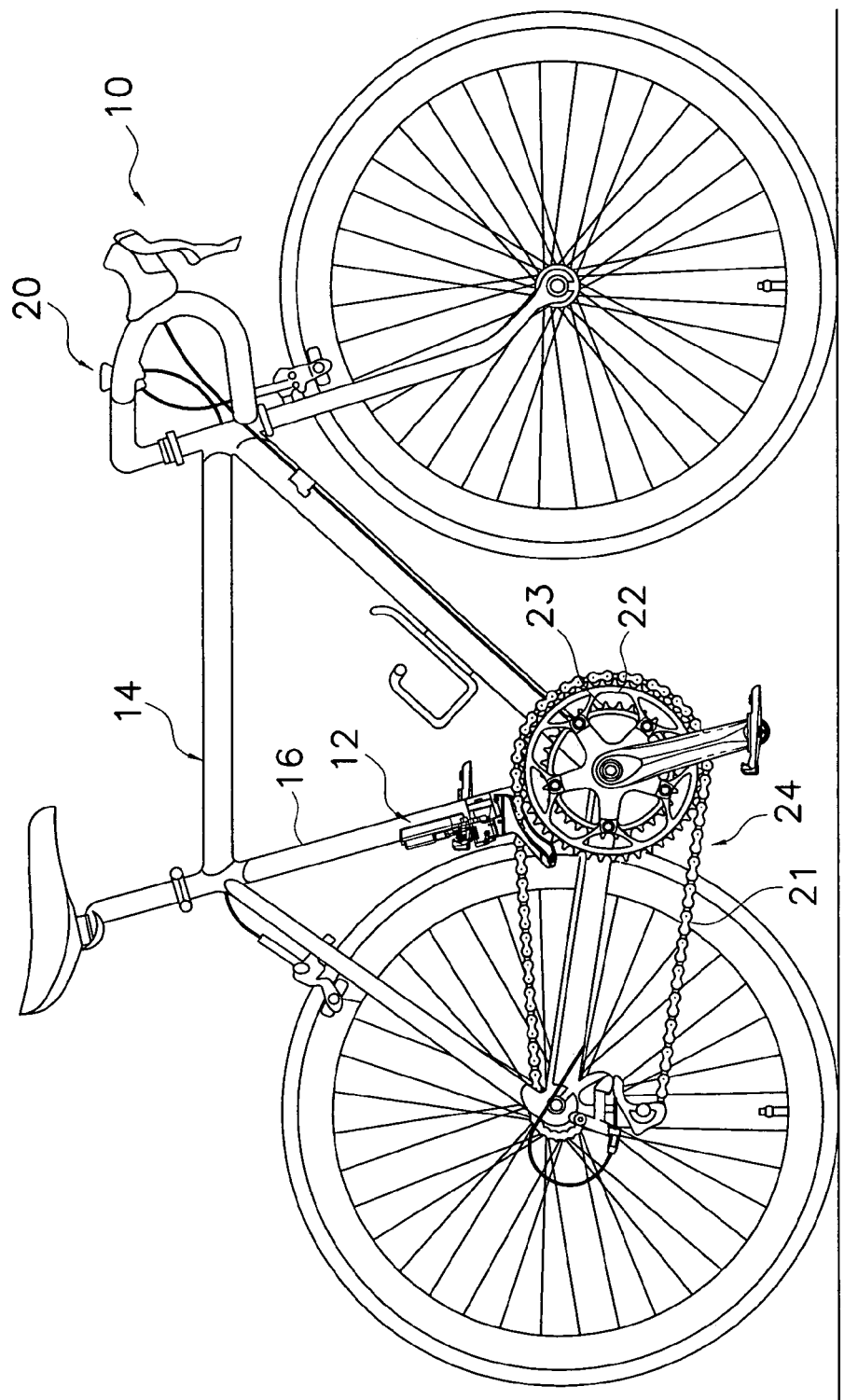
FIG. 1 is a side elevational view of a bicycle equipped with motorized front and rear derailleur assemblies in accordance with the present invention.

Referring initially to FIG. 1, a bicycle 10 is illustrated that is equipped with a motorized front derailleur 12 and a motorized rear derailleur 13 in accordance with a first embodiment of the present invention. The bicycle 10 further includes a bicycle frame 14 having a seat tube 16 with the motorized front derailleur 12 mounted to the seat tube 16 by a bracket 18 and fasteners or bolts 19 as seen in FIGS. 1-5.

Since these parts of bicycle 10 are well known in the art, these parts will not be discussed or illustrated in detail herein, except as they are modified to be used in conjunction with the present invention. Moreover, various conventional bicycle parts, which are not illustrated and/or discussed herein, can also be used in conjunction with the present invention.

Figure 8:
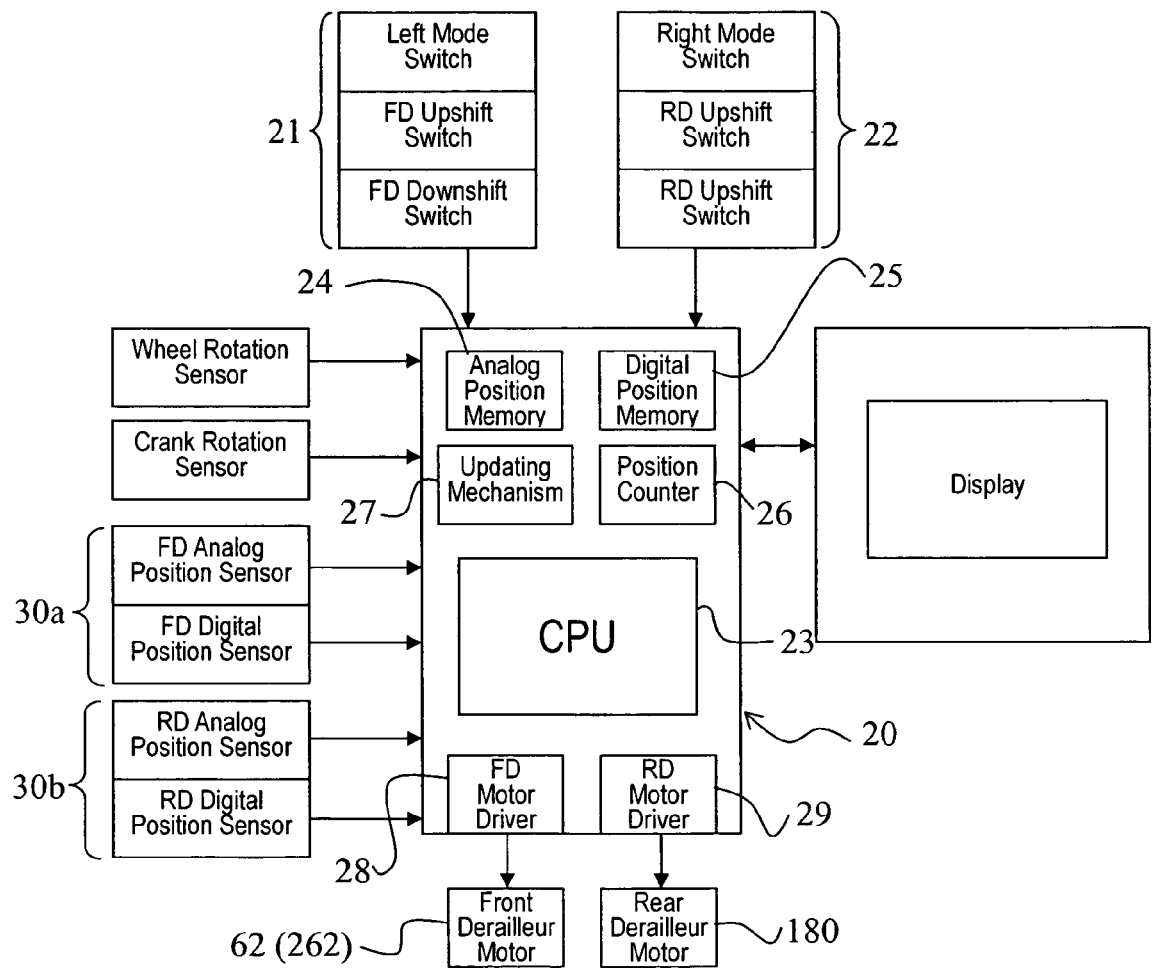
FIG. 8 is a block diagram of the electronically controlled bicycle transmission of the present invention.

Referring to FIG. 8, a block diagram of the electronically controlled bicycle transmission of the present invention is illustrated. The front and rear derailleurs 12 and 13 are operated by an electronic controller or control unit 20 that is electrically coupled to a pair of electronic shifters 21 and 22 via electric shift cables. Thus, the front and rear derailleurs 12 and 13 are operated by the rider depressing shift buttons to move a chain C between at least two front sprockets or chain wheels $S_1$ and $S_2$ or rear gears $G_1$, $G_2$, $G_3$, $G_4$, $G_5$, $G_6$ or $G_7$ of the bicycle drive train. Each of the electronic shifters 21 and 22 is preferably provided with a pair of shift buttons that are operatively coupled to the electronic controller 20, preferably in accordance with U.S. Pat. No. 6,073,730 (assigned to Shimano, Inc.) and U.S. Pat. No. 6,212,078 (assigned to Shimano, Inc.). Of course, the electronic controller 20 preferably includes front and rear automatic shifting programs that are activated by depressing the mode switches on the electronic shifters 21 and 22.

The electronic controller 20 is a processing mechanism that preferably includes a microcomputer 23 with shifting control programs that controls the front and rear derailleurs 12 and 13, as discussed below. The electronic controller 20 can also include other conventional components such as an input interface circuit, an output interface circuit, and storage devices such as a ROM (Read Only Memory) device and a RAM (Random Access Memory) device. The internal RAM of the electronic controller 20 stores statuses of operational flags and various control data. The internal ROM of the electronic controller 20 stores the predetermined parameter for various shifting operations.

The electronic controller 20 also preferably includes an analog position memory 24 for storing a plurality of analog position values, a digital position memory 25 for storing a plurality of digital position values, a position counter 26; an updating mechanism 27 for updating at least one of the analog position memory 24 and the digital position memory 25, a front derailleur motor driver 28 for providing signals that moves the front derailleur 12, and a rear derailleur motor driver 29 for providing signals that moves the rear derailleur 13. The microcomputer 23 determines the proper signals for driving the front and rear derailleurs 12 and 13 using the signals received from front and rear derailleur positioning mechanisms 30a and 30b, respectively.

The motorized front derailleur 12 basically includes a motorized front derailleur unit 31, a motorized front derailleur mounting member 32, a front derailleur motor unit 33 and a motor linkage 34. The motorized front derailleur unit 31, the front derailleur motor unit 33 and the motor linkage 34 are all mounted on the motorized front derailleur mounting member 32 that is configured and arranged to fixedly couple the motorized derailleur 12 to the seat tube 16 of the bicycle frame 14.

Figure 3:
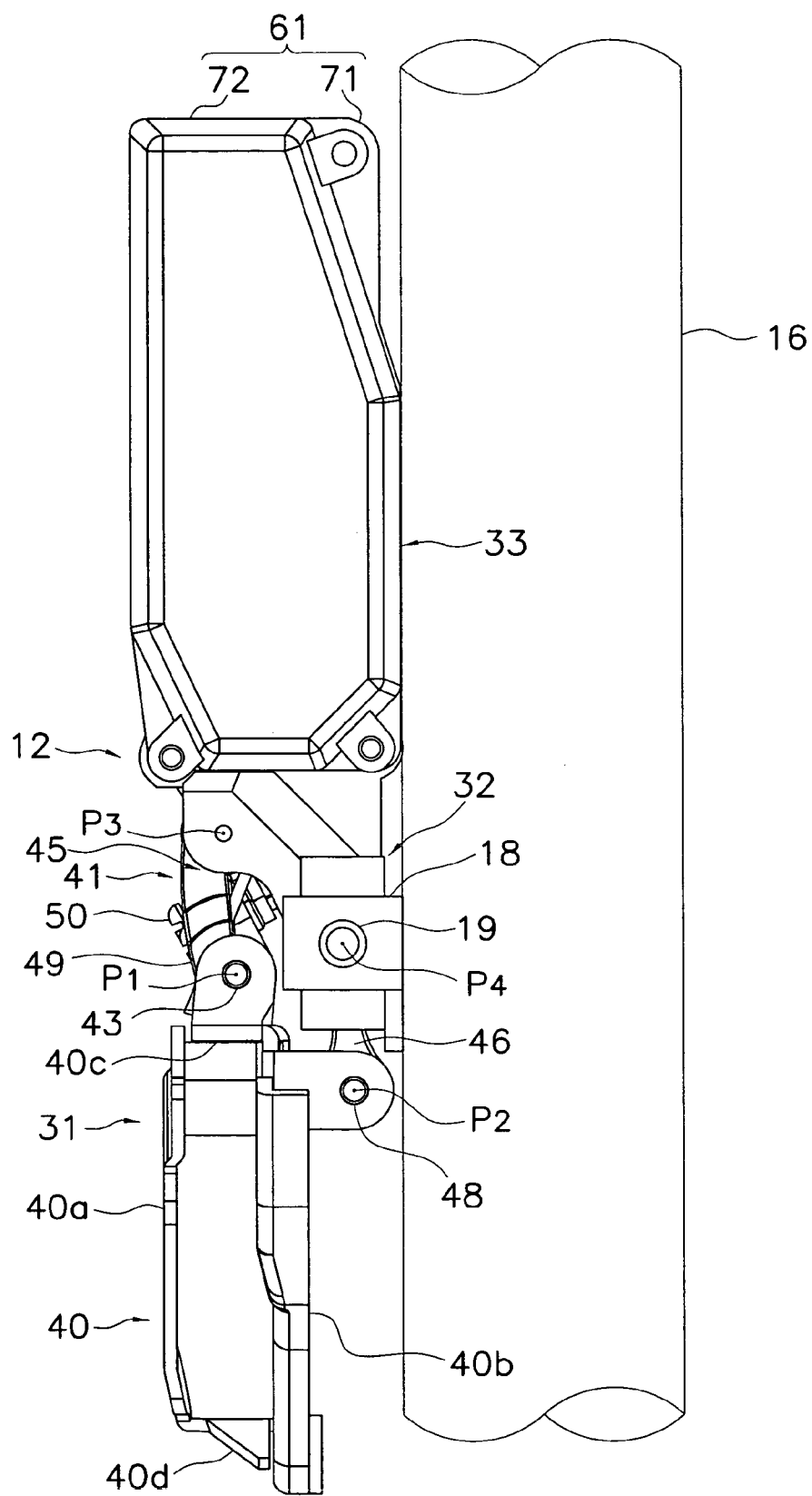
FIG. 3 is an enlarged, front elevational view of the motorized front derailleur illustrated in FIGS. 1 and 2 in the low derailleur shift position.
Figure 4:
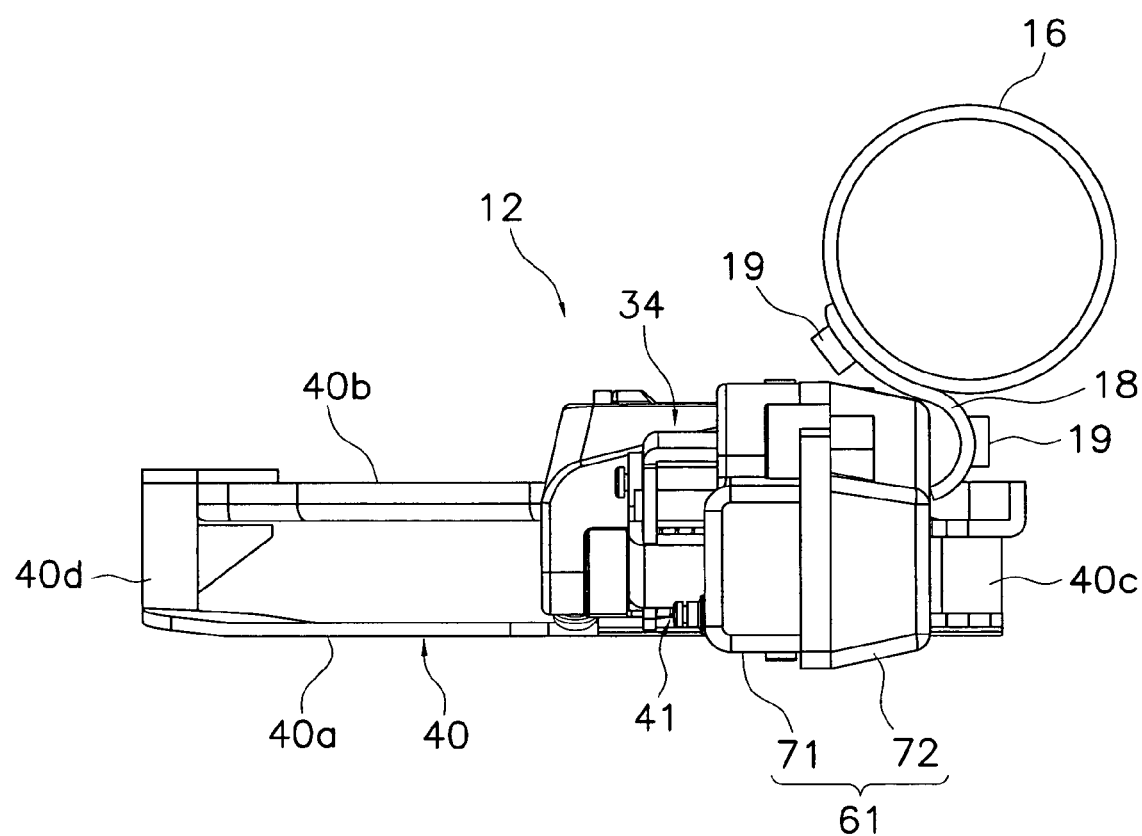
FIG. 4 is a top plan view of the motorized front derailleur illustrated in FIGS. 1-3 in the low derailleur shift position.
Figure 5:
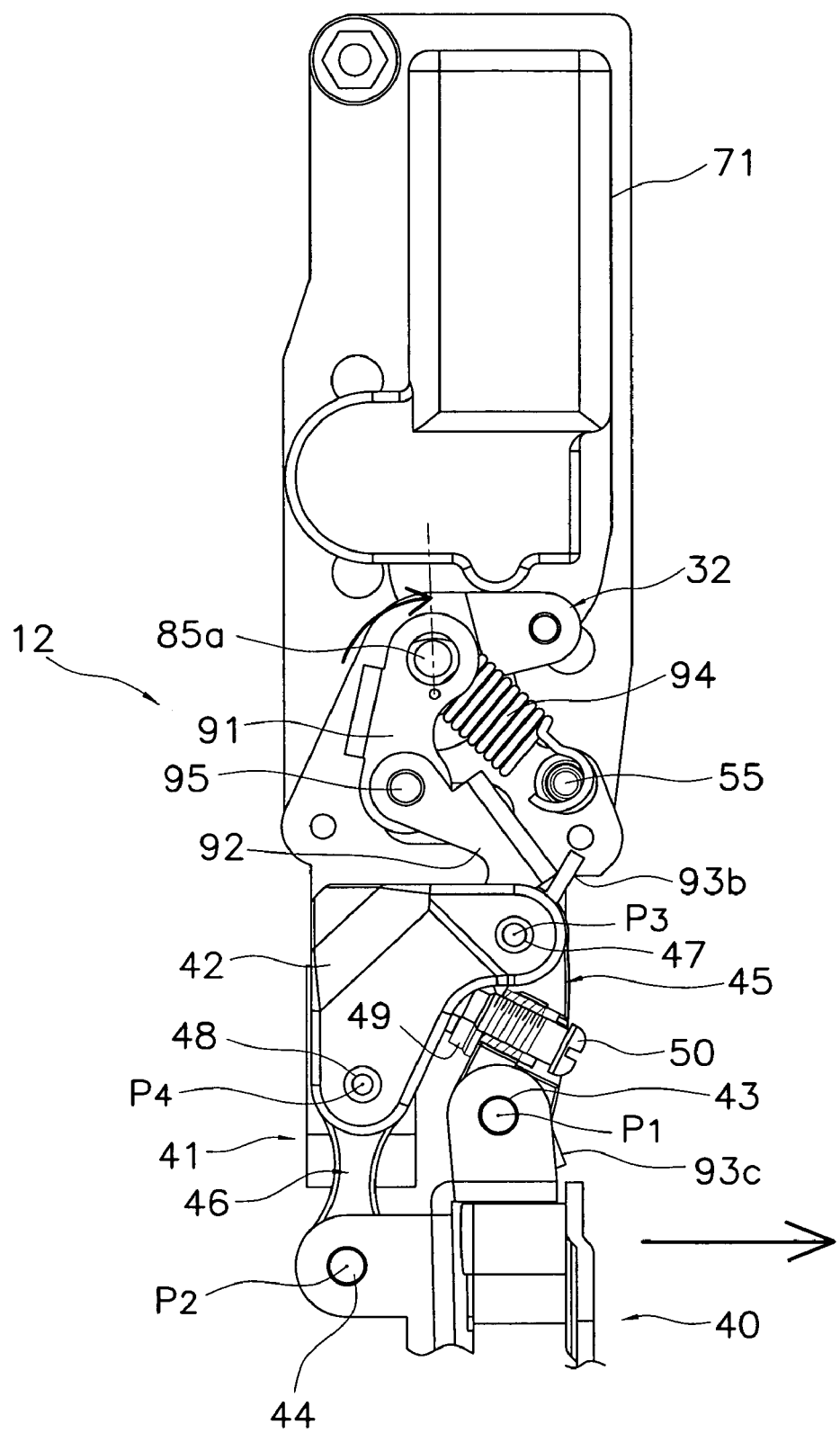
FIG. 5 is a partial rear elevational view of the motorized front derailleur illustrated in FIGS. 1-4, with a portion of the fixing body broken away for purposes of illustration.
Figure 6:
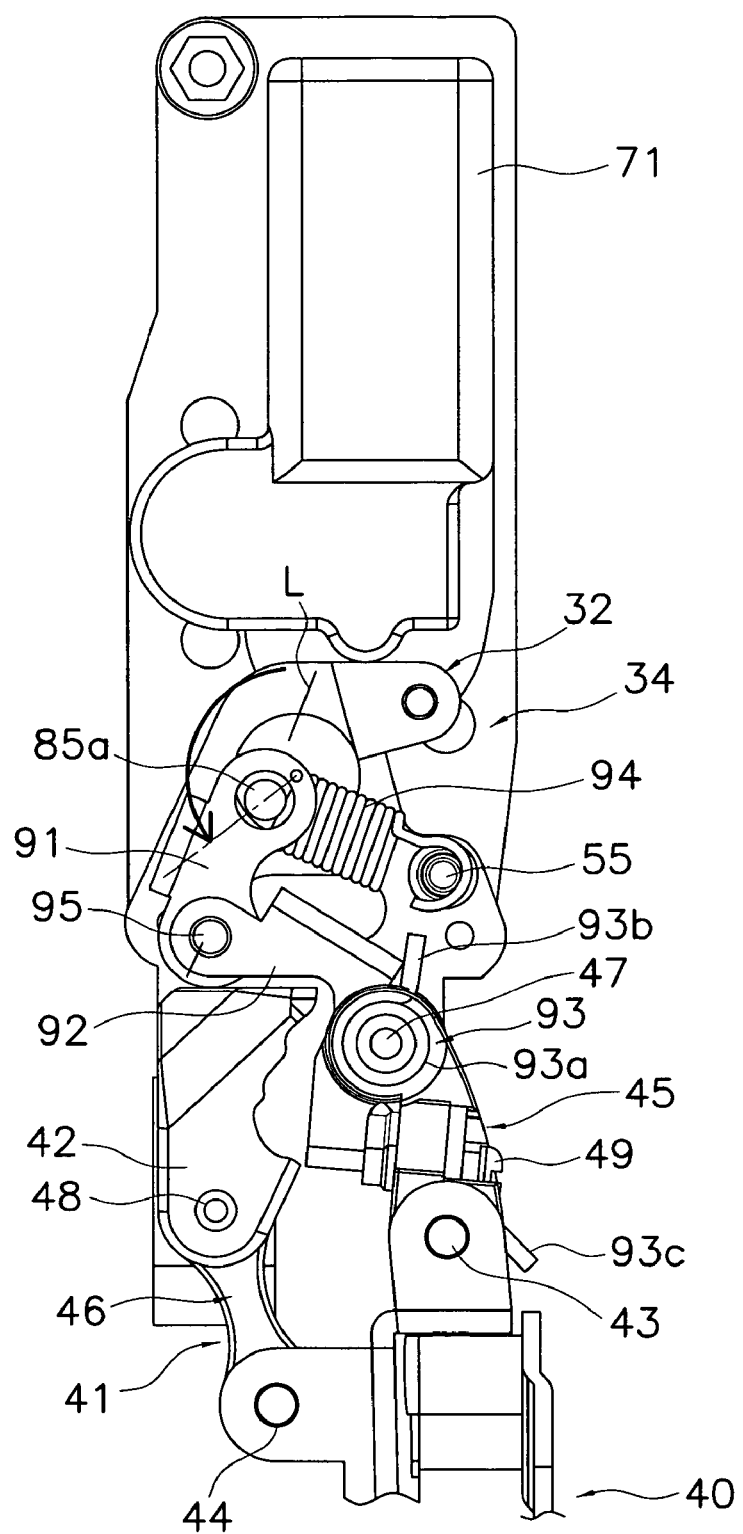
FIG. 6 is a partial, rear elevational view of the front derailleur with a portion of the fixing body broken away for purposes of illustration.

As explained more detailed later, the motorized front derailleur 12 is constructed to move between at least a low derailleur shift position as illustrated in FIGS. 1-4 and a top derailleur shift position as illustrated in FIG. 5. Moreover, as illustrated in FIG. 6, the motor linkage 34 is designed with a derailleur protection arrangement such that the derailleur motor unit 33 can operated even though the motorized front derailleur unit 32 becomes jammed. The basic operation of shifting the chain C is relatively conventional, and thus, will not be illustrated shown in detail herein.

As best seen in FIGS. 1-6, the front derailleur unit 31 basically includes a chain guide 40, a derailleur linkage 41 and a fixing body 42 that is part of the mounting member 32, as explained below. The derailleur linkage 41 together with the chain guide 40 and the fixing body 42 preferably form a four-bar linkage that controls the lateral movement of the chain guide 40. The derailleur linkage 41 is configured and arranged to operatively couple between the fixing body 42 and the chain guide 40 for lateral movement of the chain guide 40 between at least a top derailleur shift position and a low derailleur shift position, i.e., at least first and second derailleur shift positions. More specifically, the chain guide 40 is movably coupled to the fixing body 42 by a derailleur linkage 41 that is operatively coupled to the motor linkage 34 to move the chain guide 40 between a first derailleur shift position and a second derailleur shift position in response to operation of front derailleur motor unit 33. This lateral movement of the chain guide 40 causes the chain C to be shift between the sprockets 22 and 23 of the bicycle drive train 24.

Figure 7:
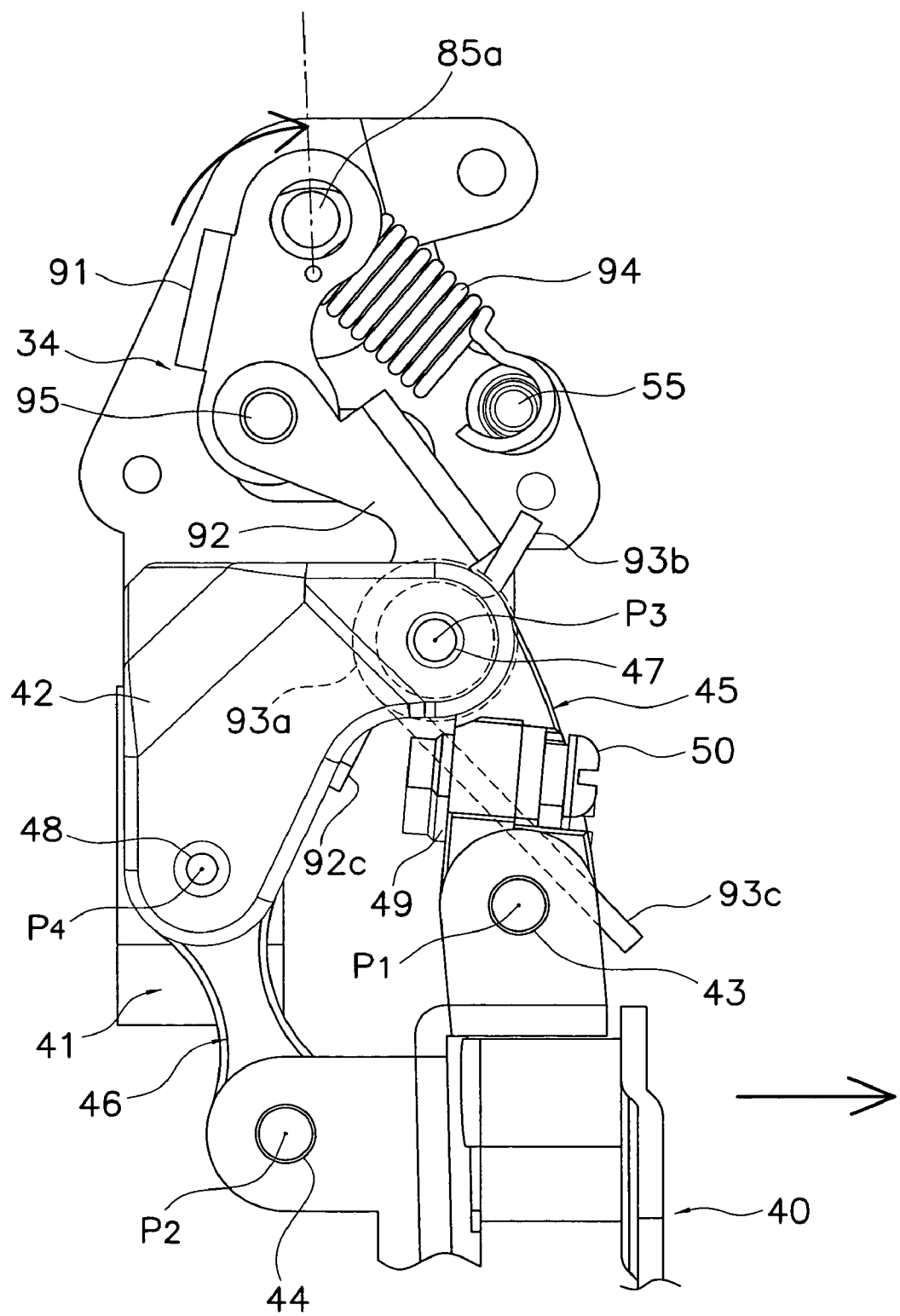
FIG. 7 is a partial, rear elevational view of the motorized front derailleur having the motor linkage in a low position and the derailleur linkage being held such that the chain guide remains in a top position.

The chain guide 40 is preferably constructed of a hard rigid material. For example, the chain guide 40 is preferably constructed of a metal material such as a rigid sheet metal that is bent to the desired shape. As best seen in FIGS. 3, 5 and 7, the chain guide 40 has first and second shifted pivot points $P_1$ and $P_2$, respectively, for pivotally securing the derailleur linkage 41 to the chain guide 40. In particular, pivot pins 43 and 44 pivotally couple the chain guide 40 to the derailleur linkage 41. The chain guide 40 has a chain receiving slot that is formed by a pair of vertical shift plates 40a and 40b. The vertical shift plates 40a and 40b are adapted to engage the chain C, and thus, move the chain C in a direction substantially transverse to the bicycle 10. The shift plates 40a and 40b are connected together by a pair of plates 40c and 40d. The upper plate 40c is integrally formed between the shift plates 40a and 40b. The lower plate 40d has one end that is integrally formed with the outer shift plate 40a, and the other end that is attached to the inner shift plate 40b via a fastener, such as a screw or rivet.

The derailleur linkage 41 basically includes a first or outer link 45 and a second or inner link 46 with first ends pivotally coupled to the fixing body 42 and with second ends pivotally coupled to the chain guide 40. Specifically, the first link 45 has a first end 45a pivotally coupled to a first fixed pivot point $P_3$ of the fixing body 42 by a pivot pin 47 and a second end 45b pivotally coupled to the first shifted pivot point $P_1$ of the chain guide 40 by the pivot pin 43. Similarly, the second link 46 has a first end 46a pivotally coupled to a second fixed pivot point $P_4$ of the fixing body 42 by a pivot pin 48 and a second end 46b pivotally coupled to the second shifted pivot point $P_2$ of the chain guide 40 by the pivot pin 44.

As apparent from the discussion above, the derailleur linkage 41 is preferably a four-bar linkage that is formed by the first or outer link 45, the second or inner link 46, the portion of the chain guide 40 extending between the first and second shifted pivot points $P_1$ and $P_2$, and the portion of the fixing body 42 extending between the first and second pivot fixed points $P_3$ and $P_4$. Thus, pivot axes of the pivot points $P_1$, $P_2$, $P_3$ and $P_4$ are all substantially parallel to each other.

When the derailleur linkage 41 holds the chain guide 40 in its extended most position, the chain guide 40 is located over the outermost sprocket 22, i.e., the furthest sprocket from the seat tube 16. When the derailleur linkage 41 holds the chain guide 40 in its retracted most position, the chain guide 40 is located over the innermost sprocket 23, i.e., the closest sprocket to the seat tube 16. These movements of the chain guide 40 and the derailleur linkage 41 are controlled by the shifting unit.

The first or outer link 45 includes two threaded holes 45c and 45d that receive a top position adjustment screw 49 and a low position adjustment screw 50. The two threaded holes 45c and 45d of the first or outer link 45 and the adjustment screws 49 and 50 form a mechanical adjustment device that finely adjusts the top and low positions of the chain guide 40. Thus, the mechanical adjustment device is configured and arranged to change the first and second derailleur shift positions (top and low end gear positions) of the chain guide 40 relative to the fixing body 42. In other words, the low adjustment screw 50 is configured and arranged to change the low derailleur shift position of the chain guide 40 relative to the fixing body 42, while the top adjustment screw 49 is configured and arranged to change the top derailleur shift position of the chain guide 40 relative to the fixing body 42. While the adjustment screws 49 and 50 are mounted on the first or outer link 45, it will be apparent from this disclosure that the adjustment screws 49 and 50 can be mounted on any one of the fixing body 42, the chain guide 40 and the links 45 and 46 with a free end of the adjustment screw contacting one of the fixing body 42, the chain guide 40 and the links 45 and 46 or the motor linkage 34 in which the adjustment screw is not threadedly coupled thereto. Also it will be apparent from this disclosure that an adjustment screw can be threadedly coupled to one of the motor linkage 34 and the derailleur linkage 41 with a free end of the adjustment screw contacting one of the motor linkage 34 and the derailleur linkage 41 in which the adjustment screw is not threadedly coupled thereto. In the illustrated embodiment, the first or low adjustment screw 50 is configured and arranged to change the first or low derailleur shift position of the chain guide 40 relative to the fixing body 42 by the free end of the low adjustment screw 50 contacting the fixing body 42, while the second or top adjustment screw 49 is configured and arranged to change the second or top derailleur shift position of the chain guide 40 relative to the fixing body 42 by the free end of the top adjustment screw 49 contacting the motor linkage 34 as explained below.

As best seen in FIGS. 11-17, the motorized front derailleur mounting member 32 basically includes a bicycle frame mounting portion 51, a front derailleur mounting portion 52 and a motor unit mounting portion 53. The bicycle frame mounting portion 51, the front derailleur mounting portion 52 and the motor unit mounting portion 53 are integrally formed as a one-piece, unitary member. The front derailleur mounting portion 52 and the motor unit mounting portion 53 form a derailleur motor support structure.

The bicycle frame mounting portion 51 is configured and arranged to be coupled to the seat tube 16 of the bicycle frame 14 by the bracket 18. The bicycle frame mounting portion 51 includes a projection 54 that projects outwardly from a first side of the motorized front derailleur mounting member 32 to a free end that forms a curved front surface 54a with a threaded hole 54b. The curved front surface 54a is configured and arranged to contact a corresponding curved portion of the bracket 18 such that the motorized front derailleur mounting member 32 cannot rotated relative to the bracket 18. One of the fasteners or bolts 19 is threaded into the threaded hole 54b of the bicycle frame mounting portion 51, while the other two fasteners or bolts 19 are threaded into the threaded holes formed the seat tube 16 such that the motorized front derailleur mounting member 32 is secured to the bicycle frame 14 via the bracket 18.

The front derailleur mounting portion 52 is configured and arranged to be coupled to a derailleur linkage 41 of the front derailleur unit 31. In particular, the front derailleur mounting portion 52 has first and second link supporting parts 52a and 52b that are configured and arranged to define a link receiving space therebetween for receiving the first and second links 45 and 46. Thus, the first and second link supporting parts 52a and 52b are configured and arranged to form the front derailleur fixing body 42. The first and second link supporting parts 52a and 52b each include a first pivot pin mounting hole 52c forming the first pivot axis of the first fixed pivot point $P_3$ and a second pivot pin mounting hole 52d forming the second fixed pivot point $P_4$. The first and second link supporting parts 52a and 52b are configured and arranged such that the first and second link supporting parts 52a and 52b are spaced different at the first pivot pin mounting holes 52c than at the second pivot pin mounting holes 52d to accommodate the different sizes of the first and second links 45 and 46. The second pivot axis of the second fixed pivot point $P_4$ is substantially parallel to the first pivot axis of the first fixed pivot point $P_3$. The first pivot axis of the second pivot pin mounting holes 52d that defines the second fixed pivot point $P_4$ passes through the threaded hole 54b.

The motor unit mounting portion 53 is configured and arranged to be coupled to the front derailleur motor unit 33. The motor unit mounting portion 53 includes a plurality (three) of threaded holes 53a that form a plurality mounting parts of the motor unit mounting portion 53. The motor unit mounting portion 53 also includes an output shaft cutout 53b that has a center axis that is substantially parallel to the pivot axes of the first and second fixed pivot points $P_3$ and $P_4$ of the front derailleur mounting portion 52. The output shaft cutout 53b of the motor unit mounting portion 53 is a hole surrounded by material of the motor unit mounting portion 53. The motor unit mounting portion 53 further includes a pin mounting hole 53c in which a spring mounting pin 55 is mounted.

Figure 35:
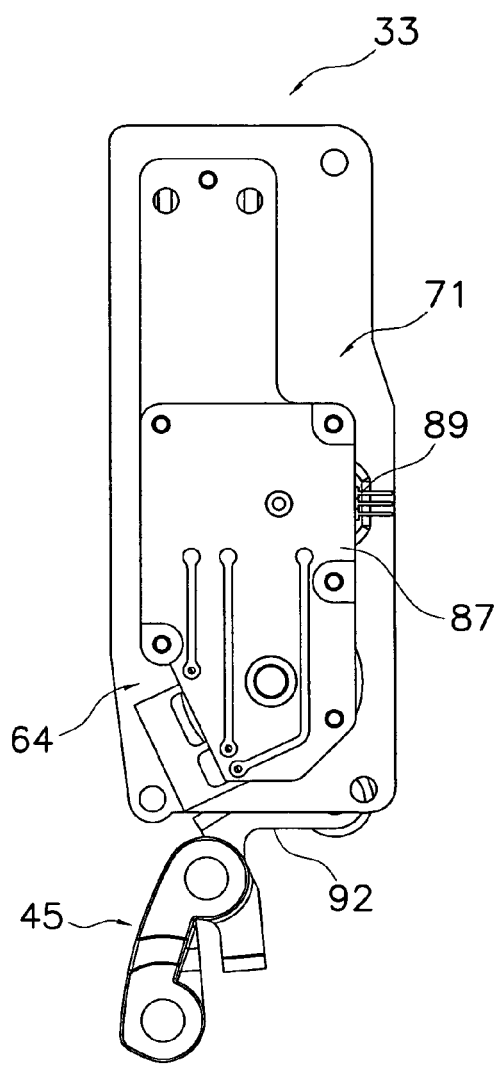
FIG. 35 is a front elevational view of the front derailleur motor unit with the cover removed.
Figure 36:
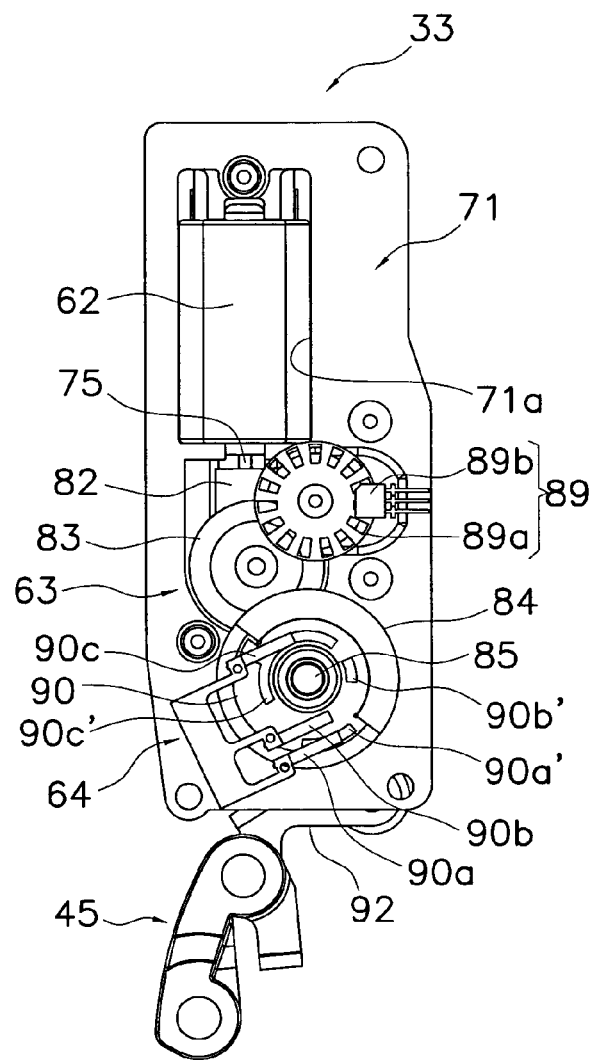
FIG. 36 is a front elevational view of the motor unit with the cover and printed circuit board removed for purposes of illustration.

Referring now to FIGS. 2-4, 10 and 35-42, the front derailleur motor unit 33 basically includes a derailleur motor unit support structure 61 (FIGS. 2, 35 and 38-42), a front derailleur motor 62 (FIGS. 36 and 37), a motor drive train 63 (FIGS. 36 and 37), and a position control mechanism or device 64 (FIGS. 35-36). The front derailleur motor unit 33 is mounted to the motor unit mounting portion 53 that forms a derailleur motor support. The front derailleur motor unit 33 is operatively coupled the chain guide 40 by the motor linkage 34 and the derailleur linkage 41. Thus, operation of the front derailleur motor unit 33 by the controller 20 causes the chain guide 40 to be shifted between the low and top derailleur shift positions.

Figure 10:
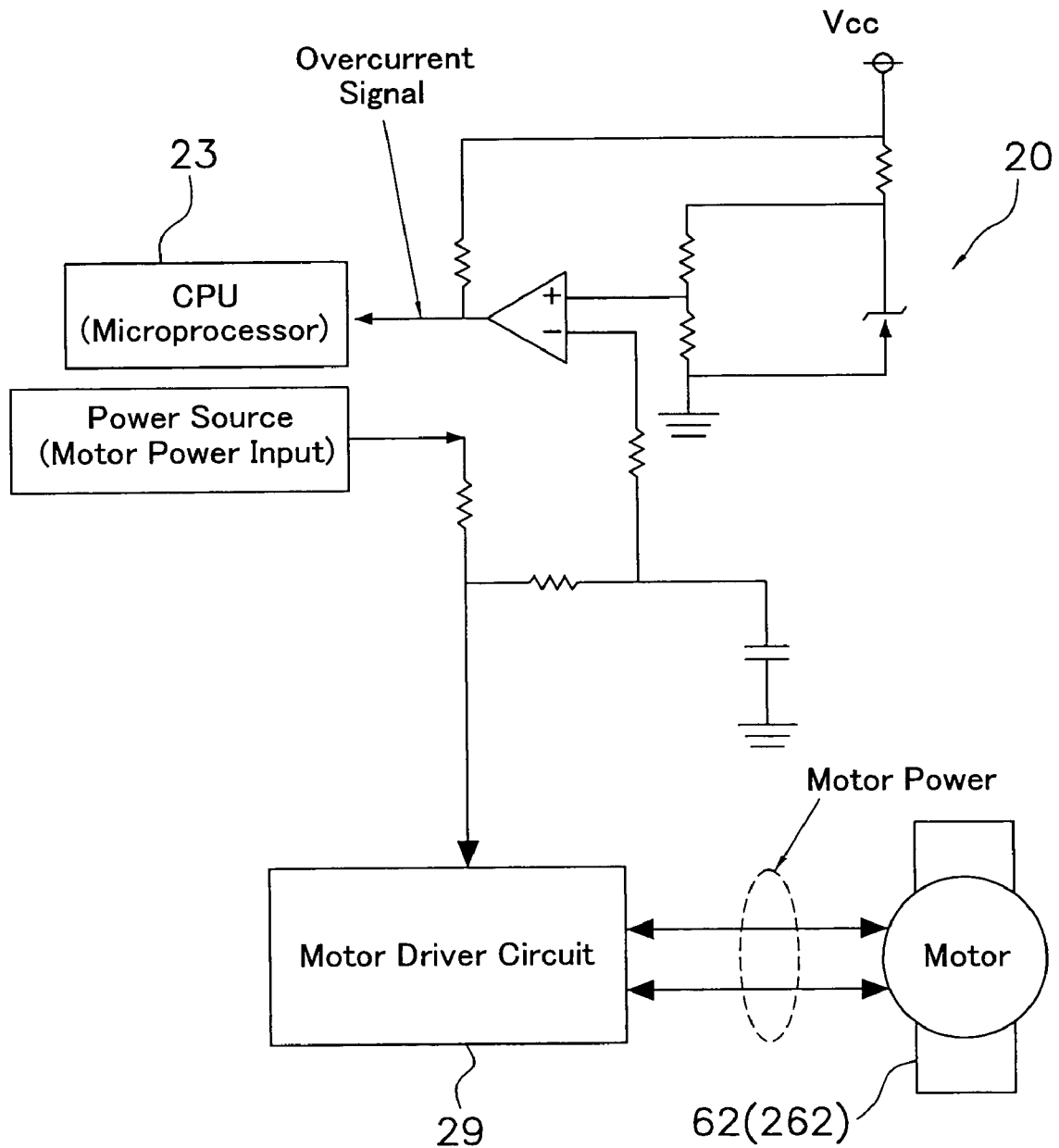
FIG. 10 is a schematic block diagram illustrating the operation of the motor utilizing the overcurrent detecting circuit.
Figure 11:
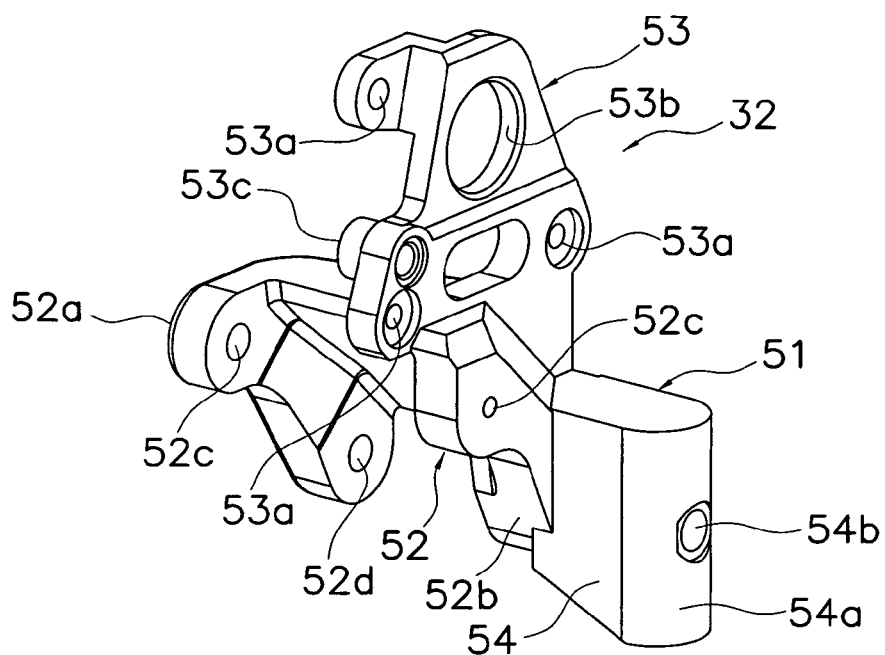
FIG. 11 is a front perspective view of the motorized front derailleur mounting member for the front derailleur illustrated in FIGS. 1-6 in accordance with the present invention.
Figure 12:
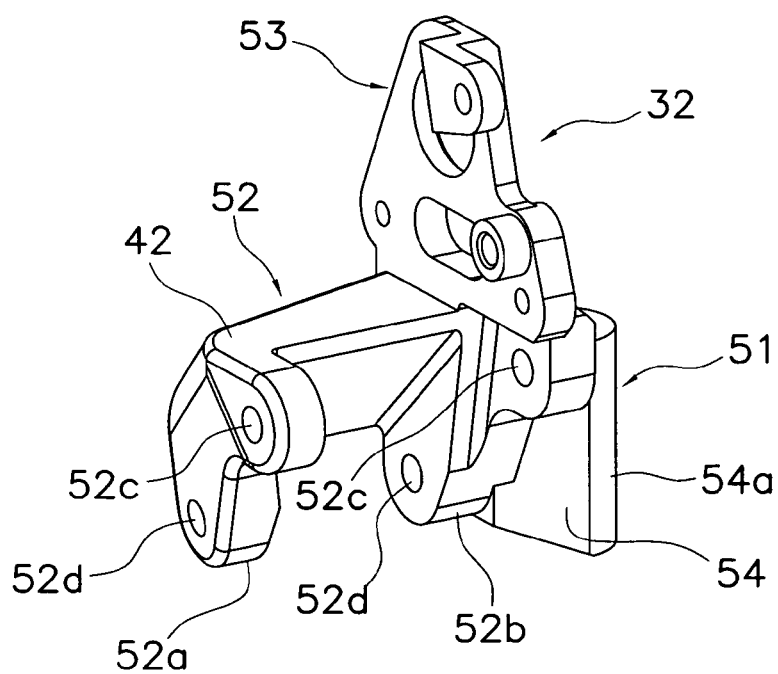
FIG. 12 is a rear perspective view of the motorized front derailleur mounting member illustrated in FIG. 11.
Figure 13:
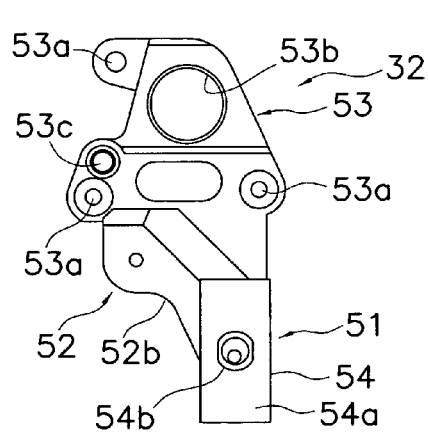
FIG. 13 is a front elevational view of the motorized front derailleur mounting member illustrated in FIGS. 11 and 12.
Figure 14:
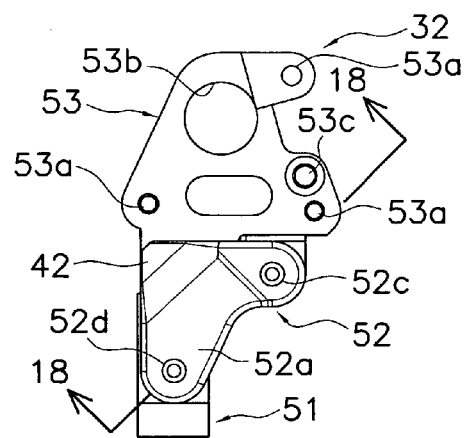
FIG. 14 is a rear elevational view of the motorized front derailleur mounting member illustrated in FIGS. 11-13.
Figure 15:
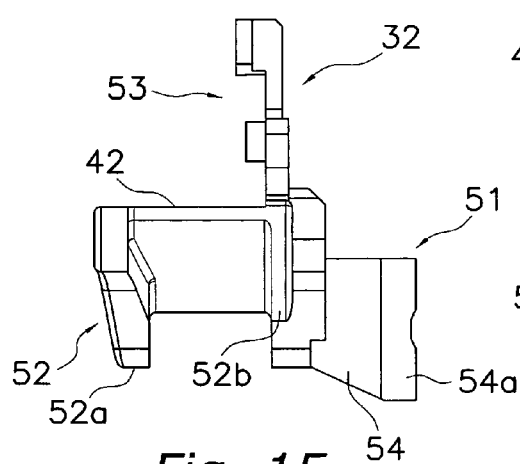
FIG. 15 is a right side elevational view of motorized front derailleur mounting member illustrated in FIGS. 11-14.
Figure 16:
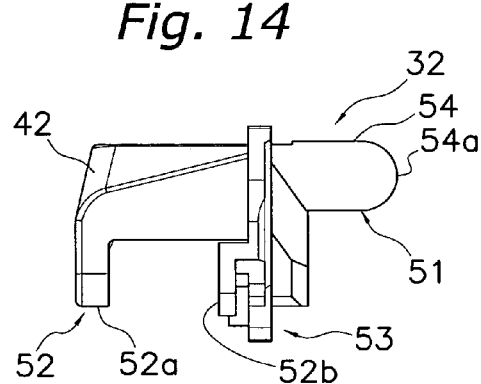
FIG. 16 is a top plan view of the motorized front derailleur mounting member illustrated in FIGS. 1-15.
Figure 17:
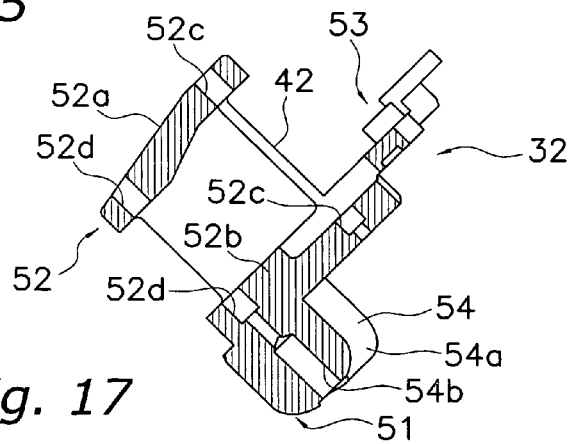
FIG. 17 is a cross-sectional view of the motorized front derailleur mounting member illustrated in FIGS. 11-16 as seen along section line 17-17 of FIG. 15.
Figure 22:
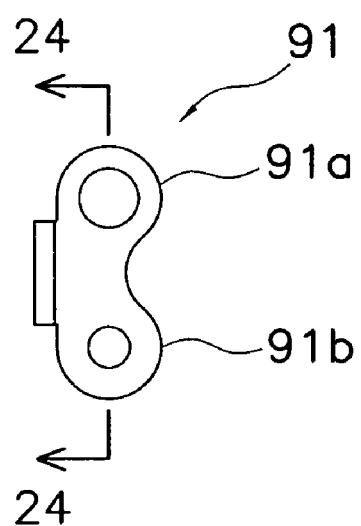
FIG. 22 is a rear elevational view of the motor link for the front derailleur illustrated in FIGS. 1-6 in accordance with the present invention.

Referring to FIG. 10, the front derailleur motor 62 is electrically connected the controller 20 which has the microcomputer 23 and the front derailleur motor driver circuit 28. An overcurrent detecting circuit is operatively coupled to the central processing unit of the microcomputer 23 and/or the motor driver circuit 28 for stopping the front derailleur motor 62 as explained below. The power source or battery can be located in either the controller 20 or a separate housing (not shown), and is operatively coupled to the front derailleur motor 62 via the motor driver circuit 29 and to the overcurrent detecting circuit. The central processing unit of the microcomputer 23, the motor driver circuit 29 and the overcurrent detecting circuit operate together to stop the movement of the front derailleur motor 62 upon detection of the front derailleur motor 62 beginning to lockup. In particular, the overcurrent detecting circuit has a comparator that compares the voltage being inputted into the motor driver circuit 29 with a predetermined reference voltage Vcc. If the voltage in the motor driver circuit 29 becomes greater than the predetermined voltage Vcc, then the comparator will send a signal to the central processing unit of the microcomputer 23 to send a motor control signal to the motor driver circuit 29 which will stop the flow of current to the front derailleur motor 62. In other words, when the front derailleur motor 62 begins to lockup, this will increase the voltage level such that an overcurrent signal is sent from the overcurrent detecting circuit back to the central processing unit of the microcomputer 23 to stop the electricity from energizing the front derailleur motor 62.

Figure 2:
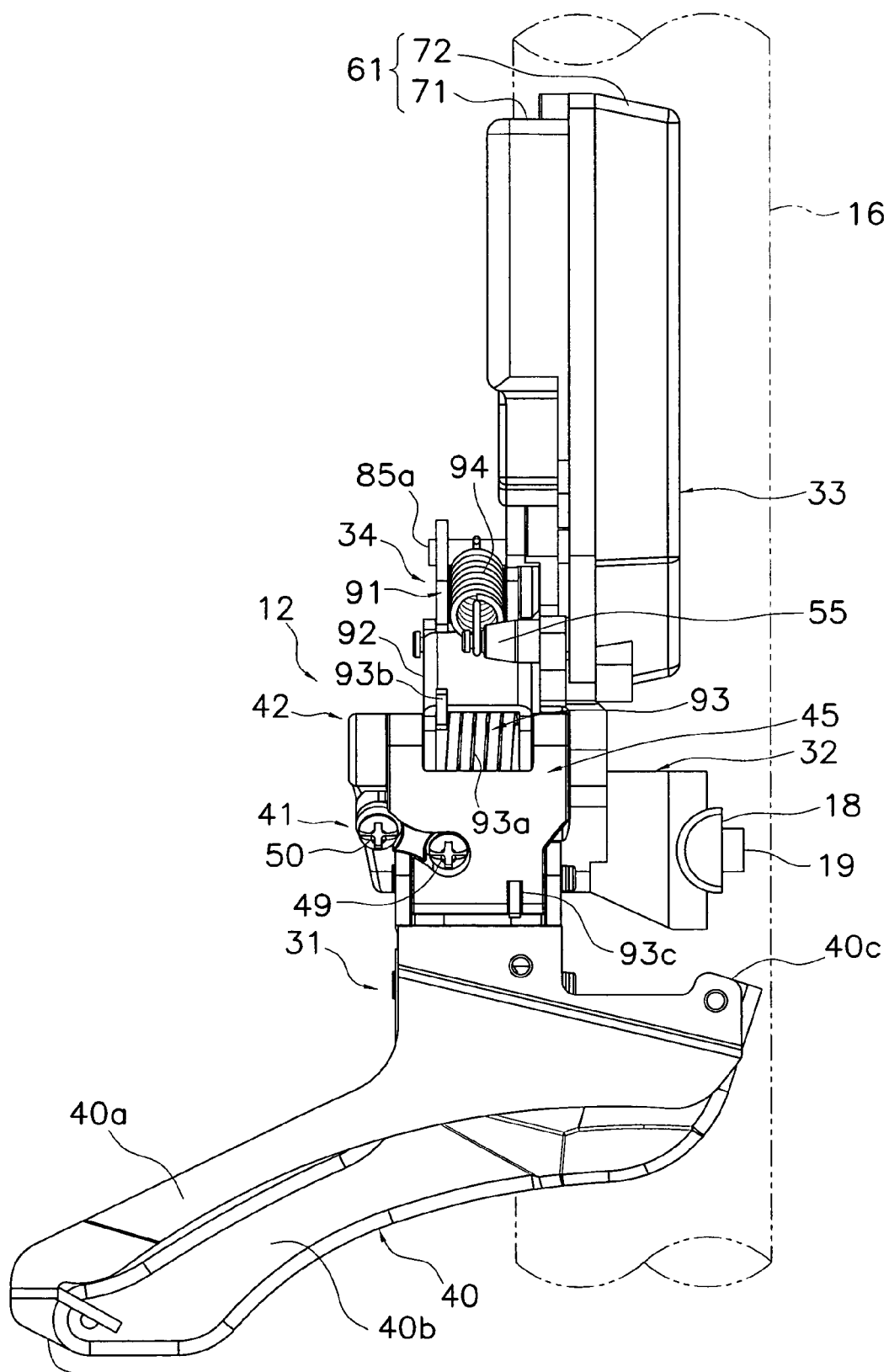
FIG. 2 is an enlarged side elevational view of the motorized front derailleur illustrated in FIG. 1 in a low derailleur shift position.

The derailleur motor unit support structure 61 basically includes a motor unit casing or housing 71 (FIGS. 38-42) and a motor unit cover 72 (FIGS. 2-4). The casing 71 and the cover 72 are configured and arranged to enclose and support the front derailleur motor 62 and the motor drive train 63. Preferably, the casing 71 and the cover 72 are constructed of a rigid, lightweight material such as a hard plastic material.

Figure 37:
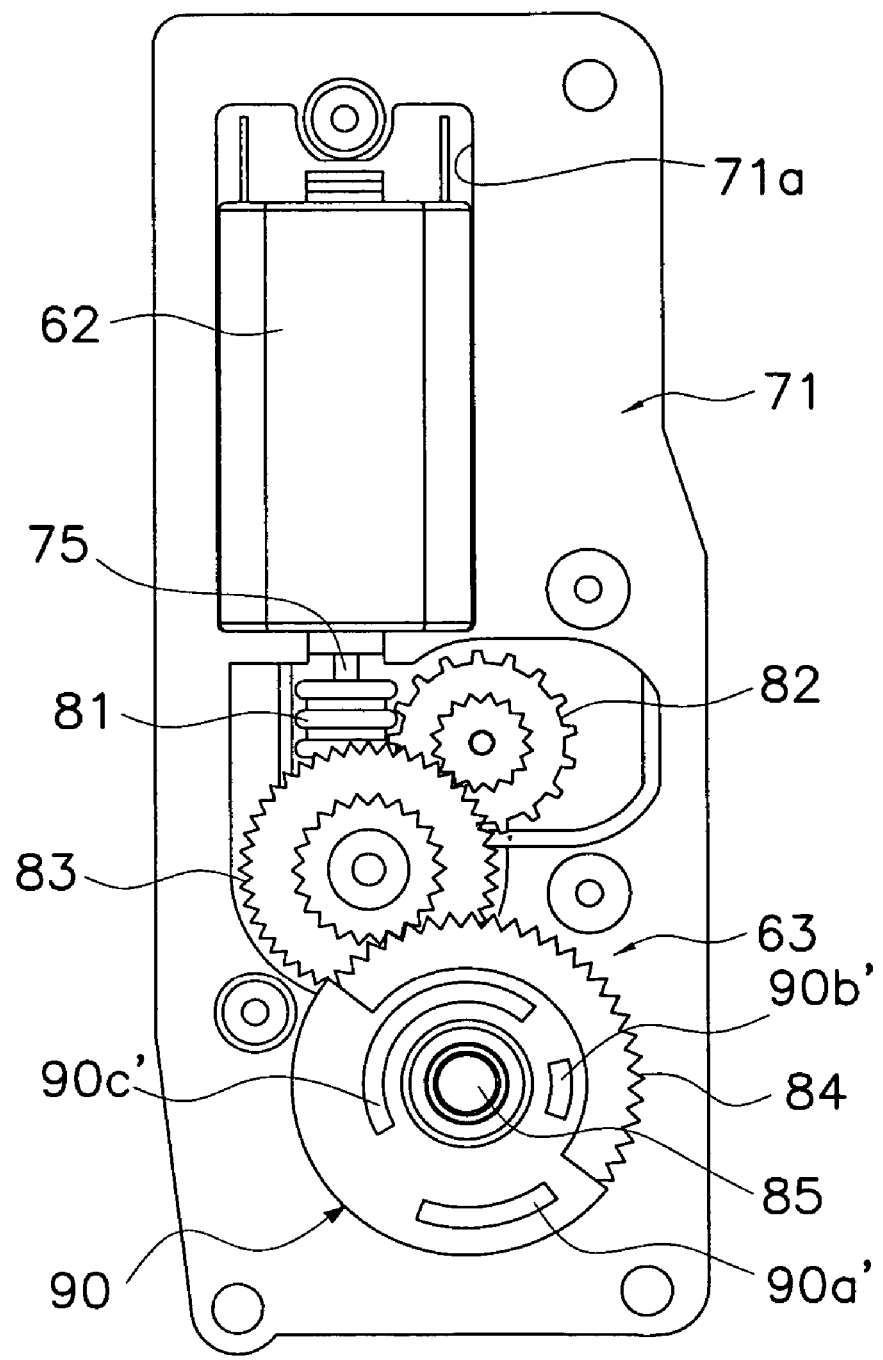
FIG. 37 is a front elevational view of the motor unit with the cover, the printed circuit board and the sensor wheel removed to illustrate the drive train of the front derailleur motor unit.
Figures 38, 39:
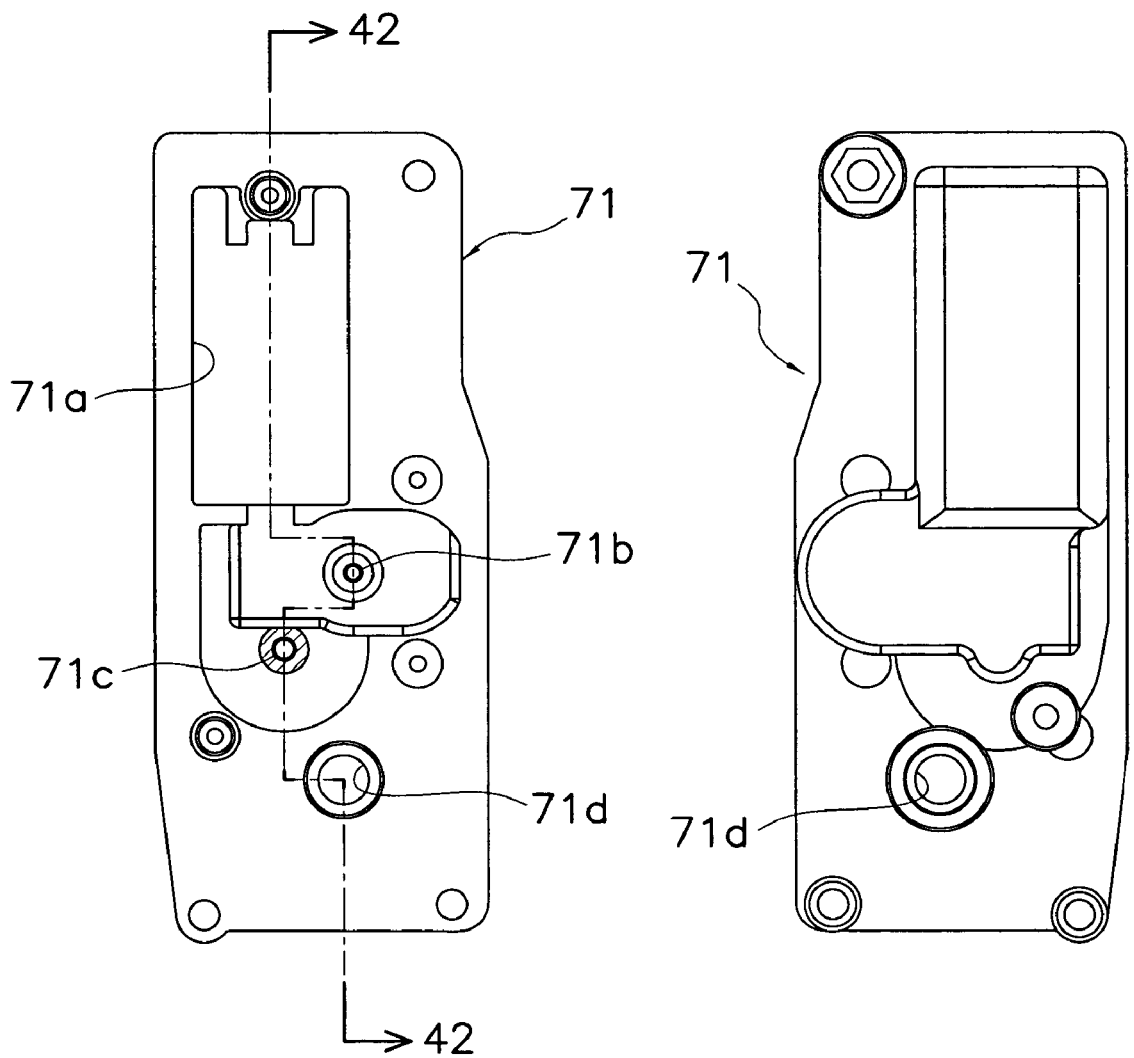
FIG. 38 is an inside elevational view of the motor casing or housing for the front derailleur motor unit.
FIG. 39 is an outside elevational view of the casing or housing illustrated in FIG. 38 for the front derailleur motor unit.
Figure 40:
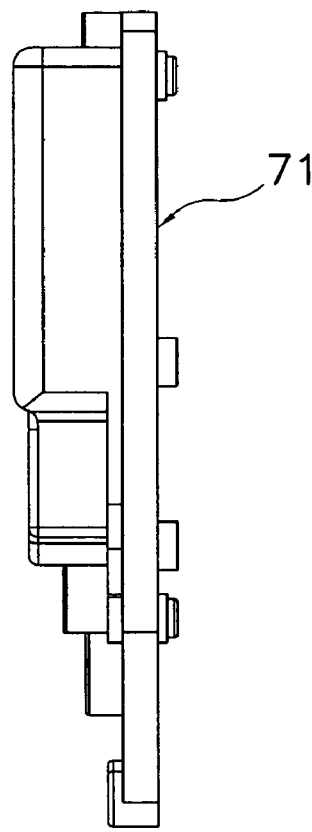
FIG. 40 is a side elevational view of the casing or housing illustrated in FIGS. 38 and 39 for the front derailleur motor unit.
Figure 41:
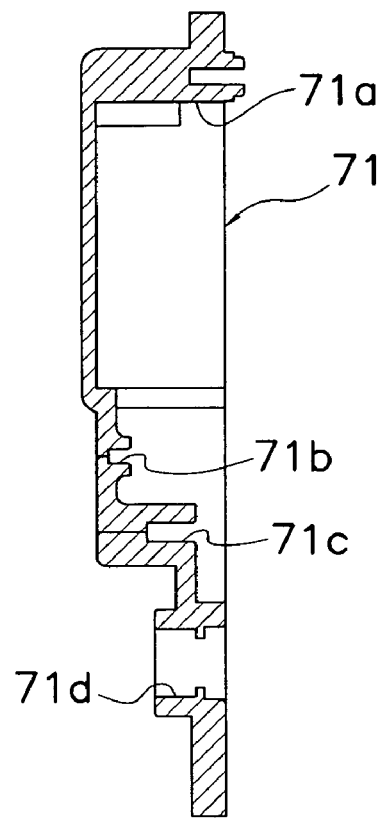
FIG. 41 is a cross-sectional view of the casing or housing illustrated in FIGS. 38-40 for the front derailleur motor unit as seen along section line 41-41 of FIG. 38.

As seen in FIGS. 36-38, the casing 71 includes a recess 71a for receiving and supporting the front derailleur motor unit 33 therein. The casing 71 also includes a pair of gear shaft supporting bores 71b and 71c and an output shaft hole 71d that are configured and arranged to support the motor drive train 63.

As seen in FIG. 37, the front derailleur motor 62 is mounted to the casing 71 of the derailleur motor unit support structure 61. The front derailleur motor 62 is a reversible electric motor that is powered by a battery source or a generator (FIG. 10). The front derailleur motor 62 is electrically coupled to the controller 20 by an electrical cord and to the power source (battery source or generator) by another electrical cord. The front derailleur motor 62 has a driving shaft 75 that is operatively coupled to the motor drive train 63. Reversible electric motors such as the front derailleur motor 62 are well known. Thus, the front derailleur motor 62 will not be discussed or illustrated in detail.

As seen in FIGS. 36 and 37, the motor drive train 63 basically includes a worm gear 81, a first intermediate gear 82, a second intermediate gear 83, and an output gear 84. The output gear 84 is mounted on an output shaft 85. The motor drive train 63 transmits rotational movement of the driving shaft 75 of the front derailleur motor 62 to the motor linkage 34 via the output shaft 85. In particular, the worm gear 81 is mounted on the driving shaft 75 of the front derailleur motor 62, with the spiral tooth of the worm gear 81 engaged with a first set of teeth of the first intermediate gear 82. The first intermediate gear 82 has a second set of teeth that engages a first set of teeth of the second intermediate gear 83, which in turn has a second set of teeth that engages the teeth of the output gear 84. The output gear 84 is mounted on the output shaft 85, which in turn is coupled to the motor linkage 34. Thus, the motor drive train 63 is disposes between the driving shaft 75 of the front derailleur motor 62 and the output shaft 85.

Figure 42:
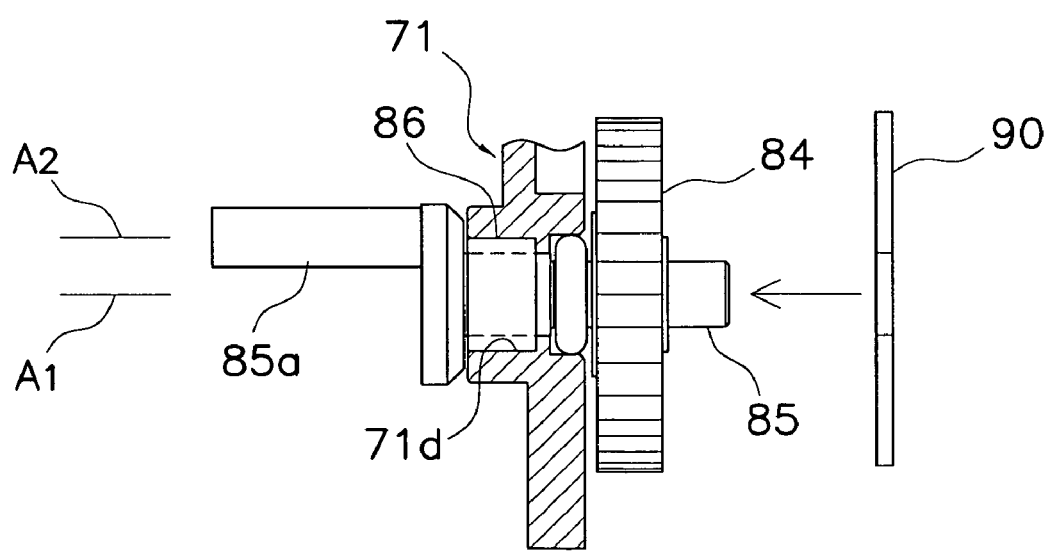
FIG. 42 is an enlarged, partial cross-sectional view of the lower portion of the casing or housing of the front derailleur motor unit having the output shaft and the output shaft gear attached thereto.

As seen in FIG. 42, the output shaft 85 is rotatably supported in the output shaft hole 71d of the casing 71 by a bearing 86. Of course, it will be apparent from this disclosure that the bearing 86 can be mounted on the motorized derailleur mounting member 32 instead of the casing 71 such that the output shaft 85 is rotatably supported on the motorized derailleur mounting member 32. In any event, the output shaft 85 is configured and arranged to rotate about a rotational axis A1 between a first rotational position and a second rotational position that is opposite the first rotational direction by rotation of the driving shaft 75 of the front derailleur motor 62. The output shaft 85 includes an eccentric drive pin 85a having an axis $A_2$ that is offset from a rotational axis $A_1$ of the output shaft 85.

As seen in FIGS. 35 and 36, the position control mechanism 64 basically includes a printed circuit board 87 with a digital signal providing mechanism in the form of a digital position sensor 89 and an analog signal providing mechanism in the form of an analog (top-low brush) position sensor 90. The digital position sensor 89 forms a digital position sensing device, while the analog position sensor 90 forms a mechanical/electrical position sensing device.

The printed circuit board 87 has a plurality of electrical circuits formed thereon in a conventional manner for controlling the operation of the front derailleur motor 62 via the controller 20 in response to signals from the electronic shifters 21 and 22, the digital position sensor 89 and the analog position sensor 90 as well as other sensors as such a wheel rotation sensor and a crank rotation sensor (FIG. 8). The digital position sensor 89 and the analog position sensor 90 are configured and arranged to send digital and analog signals, respectively, to the controller 20 such that the controller 20 controls the electrical current to the front derailleur motor 62.

The digital position sensor 89 is formed by a position sensor element or shutter wheel 89a and a photo interrupter 89b. The angular position of the output shaft 85 is determined by utilizing the shutter wheel 89a and the photo interpreter 89b. The shutter wheel 89a is mounted on the first intermediate gear 82 such that the shutter wheel 89a rotates therewith. The shutter wheel 89a is provided with a plurality of circumstantially spaced apart openings that are detected by the photo interpreter 89. In other words, the photo interpreter 89b senses the openings in the shutter wheel 89a to determine the relative position of the first intermediate gear 82. Since the position of the first intermediate gear 82 directly relates to the position of the output shaft 85, the position of the output shaft 85 can easily be determined. Thus, the controller 20 can determine the position of the chain guide 40 based on the relative position of the first intermediate gear 82.

Figure 9:
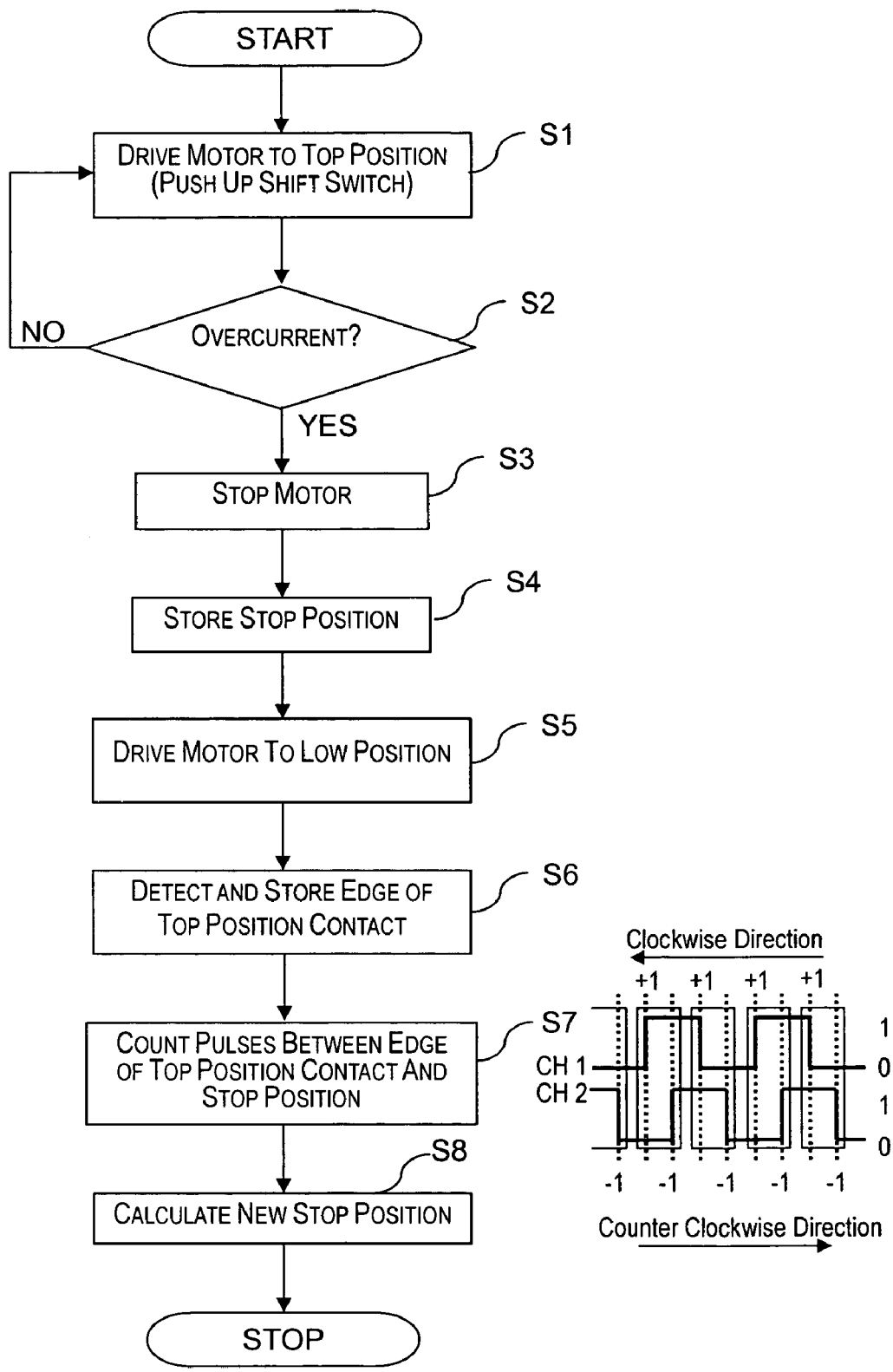
FIG. 9 is a flow chart illustrating a control program executed by the controller of the electronically controlled bicycle transmission.

The a photo interrupter 89b is preferably a dual channel photo interrupter having a light source or LED disposed on one side of the shutter wheel 89a and a light detector such as a phototransistor disposed on the other side of the shutter wheel 89a. Rotation of the shutter wheel 89a by the front derailleur motor 62 causes the passage of light of LED to phototransistor to be intermittently blocked, thus producing a digital signal having a period determined by the rate of rotation of the shutter wheel 89a. Thus, the shape of the digital signal typically will have square or rectangular saw tooth configuration with each of the pulses representing one of a plurality of angular positions of the output shaft 85. Since the photo interrupter 89b has two channels, the two digital signals will be produced by the photo interrupter 89b that are out of phase with each other as shown in FIG. 9. Thus, the digital position sensor 89 functions as an intermittent optical sensor that can detect both the rotational direction and the angular position of the output shaft 85 of the motor drive train 63 of the motor 62. The digital position sensor 89 sends a position signal indicative of an angular position and rotational direction of the output shaft 85 of the motor drive train 63 of the motor 62. In view of the operation of the digital position sensor 89, the analog position sensor 90, which operates like a potentiometer in a known manner, merely acts as an on-off sensor to indicate an edge of the top contact range spaced from the top stop position and an edge of the low contact range spaced from the low stop position.

More specifically, as seen in FIGS. 36 and 37, the analog position sensor 90 includes an electrical contact plate with three stationary electrical brushes 90a, 90b and 90c that are mounted on the printed circuit board 87, and three movable electrical contacts 90a', 90b' and 90c' that are mounted on the output shaft 85 to rotate therewith.

The electrical brushes 90a, 90b and 90c are coupled in a cantilever fashion to the printed circuit board 87 with their free ends arranged to selectively contact the movable electrical contacts 90a', 90b' and 90c' that are mounted to the output gear 84 of the output shaft 85. In other words, electrical contacts 90a', 90b' and 90c' rotate together with the output gear 84 and the output shaft 85. In other words, the brushes 90a', 90b' and 90c' cooperate with the contacts 90a, 90b and 90c to complete electrical circuit. In particular, the electrical brush 90a and the top position contact 90a' selectively contact each other to define a top derailleur position or top end gear range of the output shaft 85 from the top stop or top lockup position. The electrical brush 90b and the low position contact 90b' selectively contact each other to define a low derailleur position or low end gear range of the output shaft 85 from the low stop or low lockup position. The electrical brush 90c and the ground contact 90c' contact each other to from a ground connection either while the electrical brush 90a and the top position contact 90a' are contacting or while the electrical brush 90b and the low position contact 90b' are contacting. When the electrical brush 90a and the top position contact 90a' are contacting each other, an analog or mechanical signal is sent to the controller 20. When the electrical brush 90a and the top position contact 90a' are disengaged, the analog or mechanical signal is stop. Thus, the controller 20 can determine when the output shaft 85 is located at the top derailleur position or top end gear range. Likewise, when the electrical brush 90b and the low position contact 90b' are contacting each other, an analog or mechanical signal is sent to the controller 20. When the electrical brush 90b and the low position contact 90b' are disengaged, the analog or mechanical signal is stop. Thus, the controller 20 can determine when the output shaft 85 is located at the low derailleur position or low end gear range. Of course, the top derailleur position of the chain guide 40 is controlled by the top adjustment screw 49 contacting the motor linkage 34, while the low derailleur position of the chain guide 40 is controlled by the low adjustment screw 50 contacting the motor linkage 34. Because the operation of the digital position sensor 89 indicates both the rotational direction and angular position of the output shaft 85, the analog position sensor 90 merely acts as an on-off sensor to indicate when the electrical brushes 90a and 90b engage or disengage the top and low position contacts 90a' and 90b', respectively. More specifically, the controller 20 determines the precise location of the edges of the top and low position contacts 90a' and 90b' that are spaced from the top and low stop positions, respectively.

The controller 20 is operatively coupled to the front derailleur motor 62 and the position control mechanism 64. The controller 20 is configured to detect a predetermined lockup position of the front derailleur motor 62 occurring at one of the first and second derailleur shift positions. The controller 20 is further configured to set a predetermined stop position for the front derailleur motor 62 that is calculated distance prior to the lockup position based on the position signal of the position control mechanism 64.

Referring back to FIG. 9, when the front derailleur 12 is initially mounted to the frame 14 of the bicycle 10, the front derailleur motor 62 should be calibrated to avoid an overcurrent from occurring when the output shaft 85 is driven to a lockup position. Of course, this calibration could be conducted at the factory or before mounting to the bicycle 10.

In any event, first, the controller 20 is set to a calibration mode to start the process set forth in the flow chart of FIG. 9. In step S1, the front derailleur motor 62 is first energized by the controller 20 (e.g., depressing one of the shift buttons of the shifter 21 or otherwise supply electrical current to motor 62) to provide electrical current to the front derailleur motor 62. If the top position of the derailleur motor 62 is to be calibrated, the front derailleur motor 62 is driven from the low position towards the top position until the front derailleur motor 62 locks up.

In this first embodiment, the output gear 84 has teeth that do not extend completely around periphery of the output gear 84. Thus, the top and low lockup positions of the derailleur motor 62 occurs when the teeth of the second intermediate gear 83 reach the ends of the teeth of the output gear 84. At these point, the front derailleur motor 62 locks up and an overcurrent is produced.

Next, in step S2, the program of the controller 20 determines when the overcurrent occurs. In particular, the overcurrent circuit (FIG. 10) detects a rise in the voltage by comparing the currently detected voltage to a reference voltage Vcc. Accordingly, in step S3, the controller 20 stops electrical current to the front derailleur motor 62.

Once the front derailleur motor 62 is stopped, the stop or lockup position is stored in the memory of the controller 20 in step S4. In particular, the relative position of the position sensor element or shutter wheel 89a is stored in the digital position memory 25 of the controller 20.

Next, in step S5, the controller 20 drives the front derailleur motor 62 to the low position, preferably by this is done automatically in the calibration mode. Once the brush 90a disengages from the contact 90a', the controller 20 detects and stores the edge of the top position contact 90' in step S6. As the front derailleur motor 62 is driven between the edge of the top position contact 90' and the top stop position, in step S7, the photo sensor element 89a is rotated such that the photo interrupter 86 counts the openings in the position sensor element 89a as pulses that are used to calculate and store the number of pulses between the edge of the top position contact and the lockup position at the top derailleur shift position.

Then, in step S8, the controller 20 calculates a new stop position that is a calculated distance prior to the lockup position. For example, if there are ten pulses between the edge of the top position contact and the lockup position, then the new stop position can be set to seven pulses from the lockup position. Accordingly, when the front derailleur motor 62 is energized by the rider shifting from a low position to the top position, the controller 20 will deenergize the front derailleur motor 62 such that motor will stop seven pulses counts from the lockup position. In this way, the front derailleur motor 62 will not be driven to a lockup condition in future up shifts from the top position. It will be apparent to those skilled in the art from this disclosure that the low position can also be calibrated in a similar matter.

Of course, this calibration process can be done in a different order using few or more steps as needed and/or desired. For example, step S5 can be eliminated by performing detecting of the top position edge (step S6) and the counting of the pulse (step S8) in a different order.

Referring back to FIGS. 1-6, the motor linkage 34 basically includes a drive or motor link 91, a saver link 92, a saver link biasing element 93 and a position biasing element 94. The saver link 92 and the saver link biasing element 93 form a jamming protection arrangement. The motor linkage 34 is operatively coupled between the eccentric drive pin 85a of the output shaft 85 and the derailleur linkage 41. This jamming protection arrangement is configured and arranged to move between a force transmitting state and a force override state.

Figure 23:
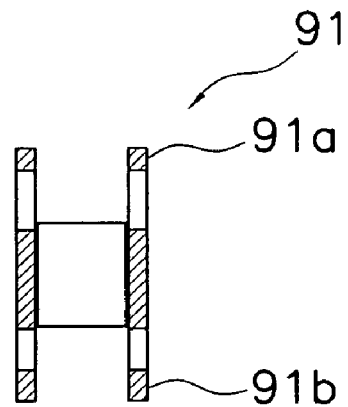
FIG. 23 is a longitudinal cross-sectional view of the motor link illustrated in FIG. 22 as seen along section line 23-23.
Figure 24:
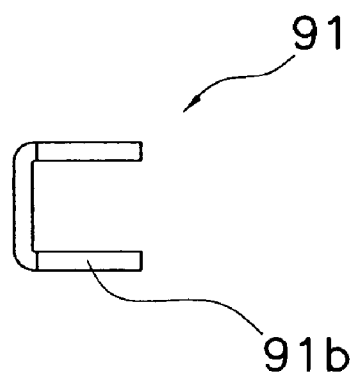
FIG. 24 is a top end elevational view of the motor link illustrated in FIGS. 22 and 23.

As seen in FIGS. 4-6, the drive link 91 is configured and arranged relative to the output shaft 85 and the derailleur linkage 41 to shift the chain guide 40 between the first derailleur shift position and a second derailleur shift position. The drive link 91, as particularly seen in FIGS. 23-25, has a first drive link end 91a and a second drive link end 91b. The first drive link end 91a is mounted on the eccentric drive pin 85a of the output shaft 85 such that the eccentric drive pin 85a can rotate within the holes formed in the first drive link end 91a. The second drive link end 91b is pivotally coupled to the saver link 92 by a pivot pin 95. Thus, when the output shaft 85 is rotated, the drive link 91 is moved or shifted.

As best seen in FIGS. 25-28, the saver link 92 preferably has a first saver link end 92a, a second saver link end 92b and a control or stop flange 92c. The first saver link end 91a of the saver link 92 is pivotally coupled to the second drive link end 91b of the drive link 91 by the pivot pin 95. The second saver link end 92b is operatively coupled to the first or outer link 45 of the derailleur linkage 41. The control or stop flange 92c extends from the second saver link end 92b and is arranged to contact the top adjustment screw 49 when the motor linkage 34 is driven to the top derailleur shift position as seen in FIG. 6. Thus, the second or top adjustment screw 49 is configured and arranged to change the second or top derailleur shift position of the chain guide 40 relative to the fixing body 42 by the free end of the top adjustment screw 49 contacting the control or stop flange 92c of the saver link 92.

In adjusting the front derailleur unit 31, the front derailleur unit 31 is mounted to the frame 12 by the motorized front derailleur mounting member 32 and bracket 18. Then the top derailleur shift position is set by adjusting the top adjustment screw 49 so that the chain guide 40 is disposed over the front chain wheel 22. This adjustment of the top derailleur shift position causes the relative orientation between the outer link 46 and the saver link 92 to change. In particular, the adjusting of the top adjustment screw 49 changes the relative orientation between the outer link 46 and the saver link 92 by counteracting the urging force of the saver link biasing element 93, i.e., compressing the saver link biasing element 93. Once the top derailleur shift position has been set, the low derailleur shift position is also changed by the adjusting of the top adjustment screw 49 because the chain guide 40 moves with the outer link 46. Thus, the low position is next set by using the low adjustment screw 50, which contacts the fixing body 42, such that the chain guide 40 is disposed over the smaller front chain wheel 23. In other words, the adjusting of the low adjustment screw 50 changes the relative orientation between the outer link 46 and the saver link 92 when the chain guide 40 is disposed over the front chain wheel 23 by further counteracting the urging force of the saver link biasing element 93, i.e., further compressing the saver link biasing element 93.

Figures 29, 30:
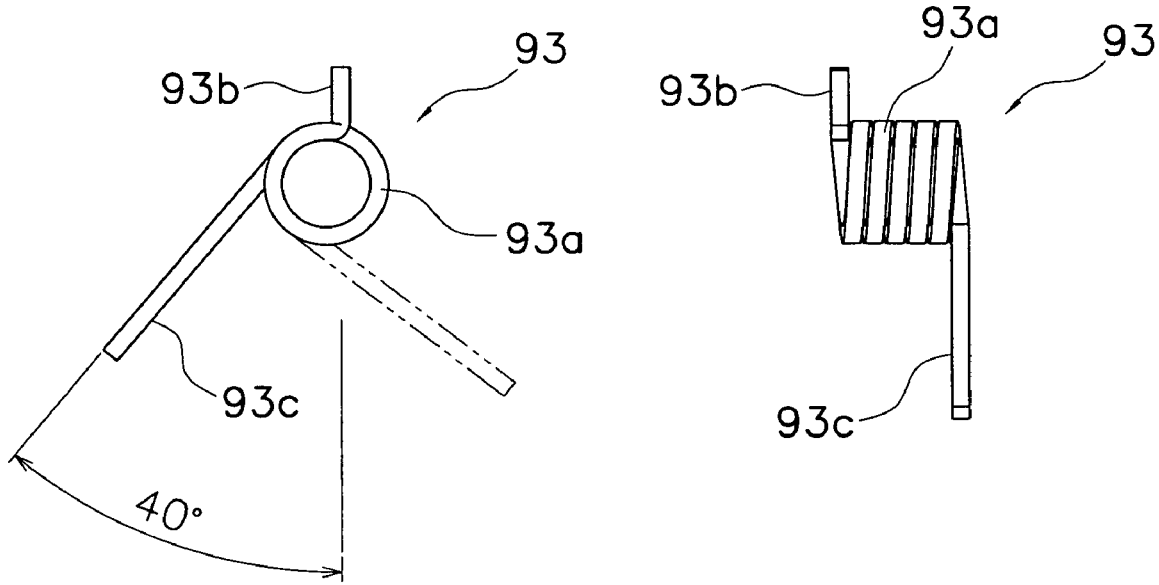
FIG. 29 is a side elevational view of the saver spring for the front derailleur illustrated in FIGS. 1-6 in accordance with the present invention.
FIG. 30 is an elevational view of the saver spring illustrated in FIG. 29.
Figures 31, 32:
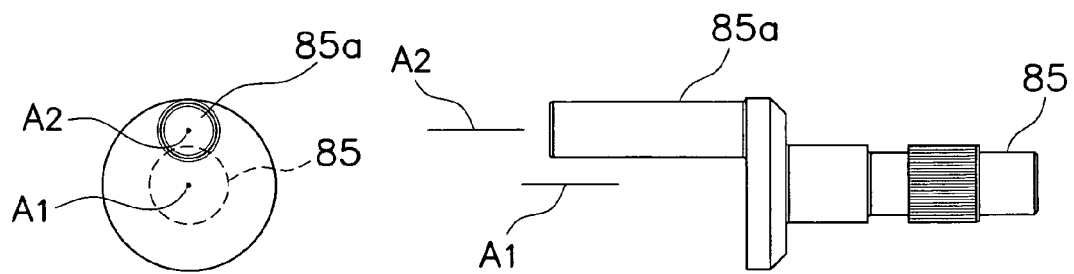
FIG. 31 is an axial view of the output shaft for the front derailleur illustrated in FIGS. 1-6 in accordance with the present invention.
FIG. 32 is a side view of the output shaft illustrated in FIG. 31.
Figure 33:
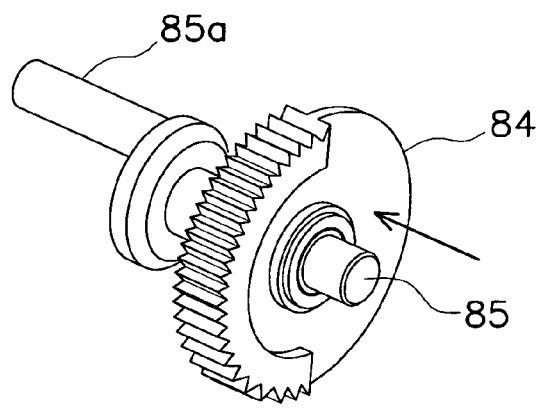
FIG. 33 is a perspective view of the output shaft with the output gear mounted thereto in accordance with the present invention.
Figure 34:
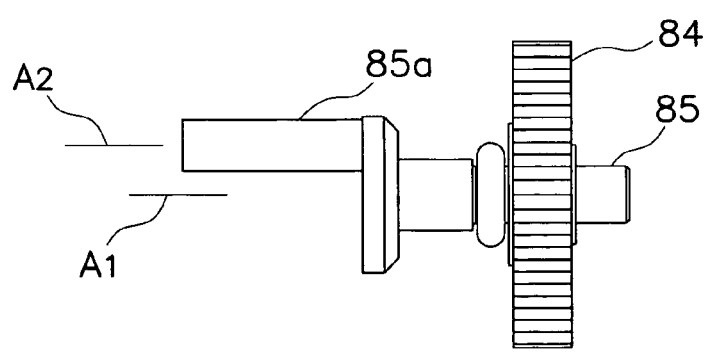
FIG. 34 is a side elevational view of the output shaft with the output shaft gear mounted thereto.

As best seen in FIGS. 29 and 30, the saver link biasing element 93 is preferably a torsion spring having a coiled portion 93a, a first leg portion 93b and a second leg portion 93c. The coiled portion 93a is located about the pivot pin 47 that connects the saver link 92 to the first or outer link 45. The first leg portion 93b of the saver link biasing element 93 engages the saver link 92, while the second leg portion 93b contacts the first or outer link 45 of the derailleur linkage 41. Thus, the saver link 92 is biased in a counter clockwise direction about pivot pin 47 as viewed from the rear of the derailleur. Likewise, the first or outer link 45 is also biased in a counterclockwise direction about the pivot pin 47 as viewed from the rear of the derailleur. In other words, the saver link biasing element 93 is configured and arranged to apply an urge force that normally maintains a substantially rigid connection between the drive link 91 and the derailleur linkage 41. Accordingly, the saver link 92 is pivotally coupled to the derailleur linkage 41 and the saver link biasing element 93 is operatively coupled between the saver link 92 and the derailleur linkage 41 to urge the saver link 92 from the force override state to the force transmitting state such that a substantially rigid connection is normally maintained between the saver link and the derailleur linkage 41.

Thus, as seen in FIG. 6, if the chain guide 40 is stuck in the top position, and the motor linkage 34 is driven by the output shaft 85 to a low derailleur shift position, the saver link 92 will rotate in a clockwise direction in about the pivot pin 47 as viewed from the rear of the derailleur against the urging force the first leg portion 93b of the saver link biasing element 93. Thus, a non rigid connection is formed between the saver link 92 and the derailleur linkage 41 by utilizing the saver link 92 and the saver link biasing element 93. In other words, the saver link 92 and the saver link biasing element 93 form a non-rigid connection that connects a second drive link end 91b of the drive link 91 to the derailleur linkage 41. This non-rigid connection forms the jamming protection arrangement.

The position biasing element 94 is preferably a tension spring that has a first end coupled to the eccentric drive pin 85a and a second end connected to the spring mounting pin 55 of the motor unit mounting portion 53. The position biasing element 94 is configured and arranged such that the urging force of the position biasing element 94 holds the motor linkage 34 in either the top position or the low position. In other words, when the motor linkage 34 is in the top position, the line of force of the position biasing element 94 is offset from the rotational axis A1 of the output shaft 85 to apply a clockwise force on the output shaft 85 as viewed from the rear of the derailleur 12. However, when the motor linkage 34 moved to the low position, the line of force of the position biasing element 94 is such that a counterclockwise force is applied to the output shaft 85. Accordingly, the position biasing element 94 is configured and arranged to insist assist in the holding chain guide 40 in either the top or low position when the motor is no longer energized.

Figure 43:
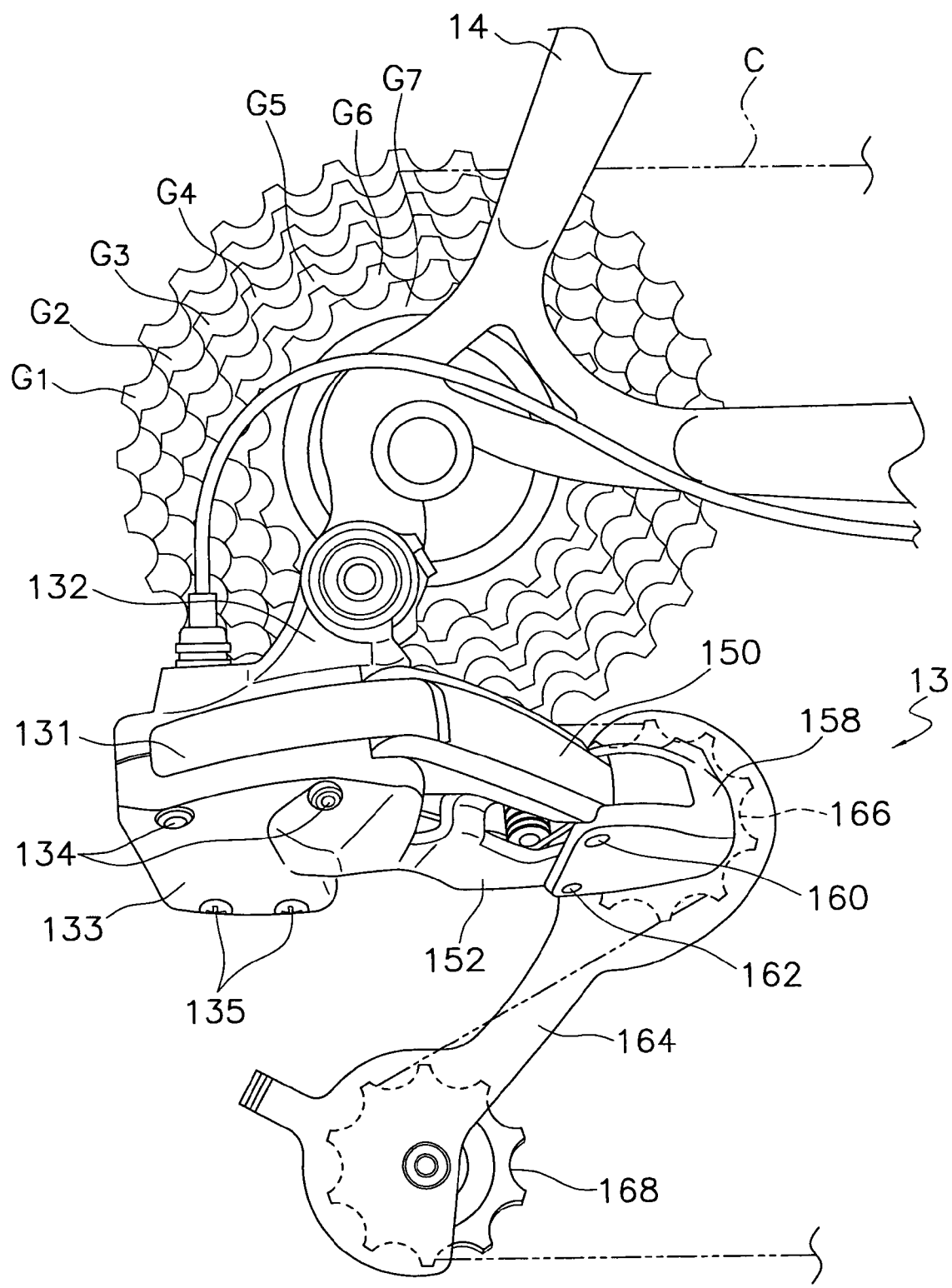
FIG. 43 is a side elevational view of the rear derailleur with the rear motor unit.
Figure 44:
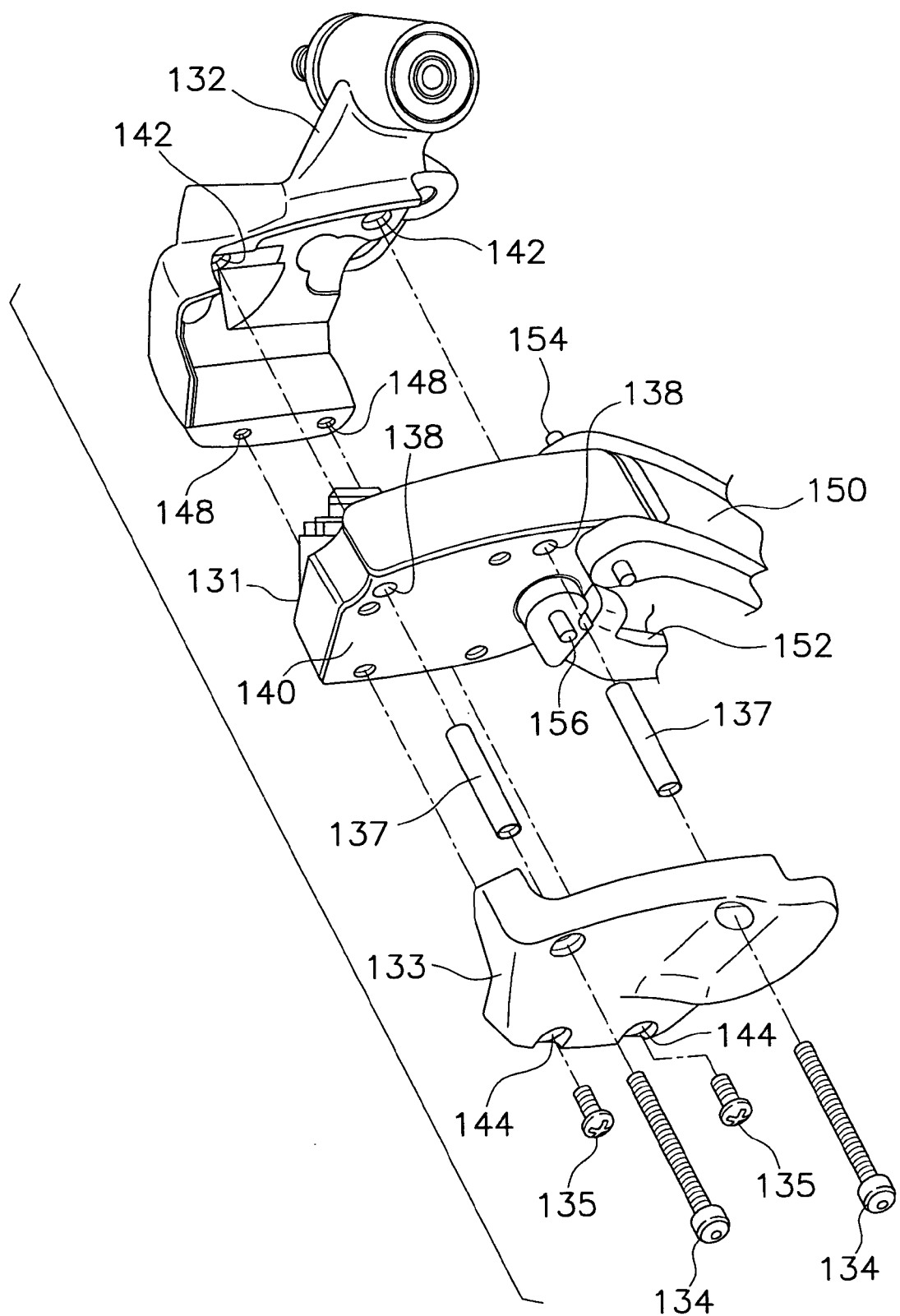
FIG. 44 is a partial exploded perspective view of the rear derailleur with the rear motor unit illustrated in FIG. 43.

As shown in FIGS. 43 and 44, the rear derailleur 13 is mounted to the frame 14 in close proximity to the sprocket unit for moving chain C among the plurality of rear sprockets $G_1$-$G_7$. The rear derailleur 13 includes a rear derailleur control housing 131 that is mounted between a base member 132 and an outer cover 133. The base member 132 is swingably mounted to the frame 14 in a known manner, and it includes an electrical connector for connecting to a complementary connector on intermediate communication path that is connected to the controller 20. As shown in FIG. 44, the outer cover 133 and the rear derailleur control housing 131 are mounted to the base member 132 by screws 134 and 135. The screws 134 extend through openings in the outer cover 133, through the spacer tubes 137 that extend through openings 138 in a rear derailleur control housing cover 140 and into threaded openings 142 in the base member 132. The screws 135 extend through openings 144 in the outer cover 133, and into threaded openings 148 in the base member 132.

Figure 46:
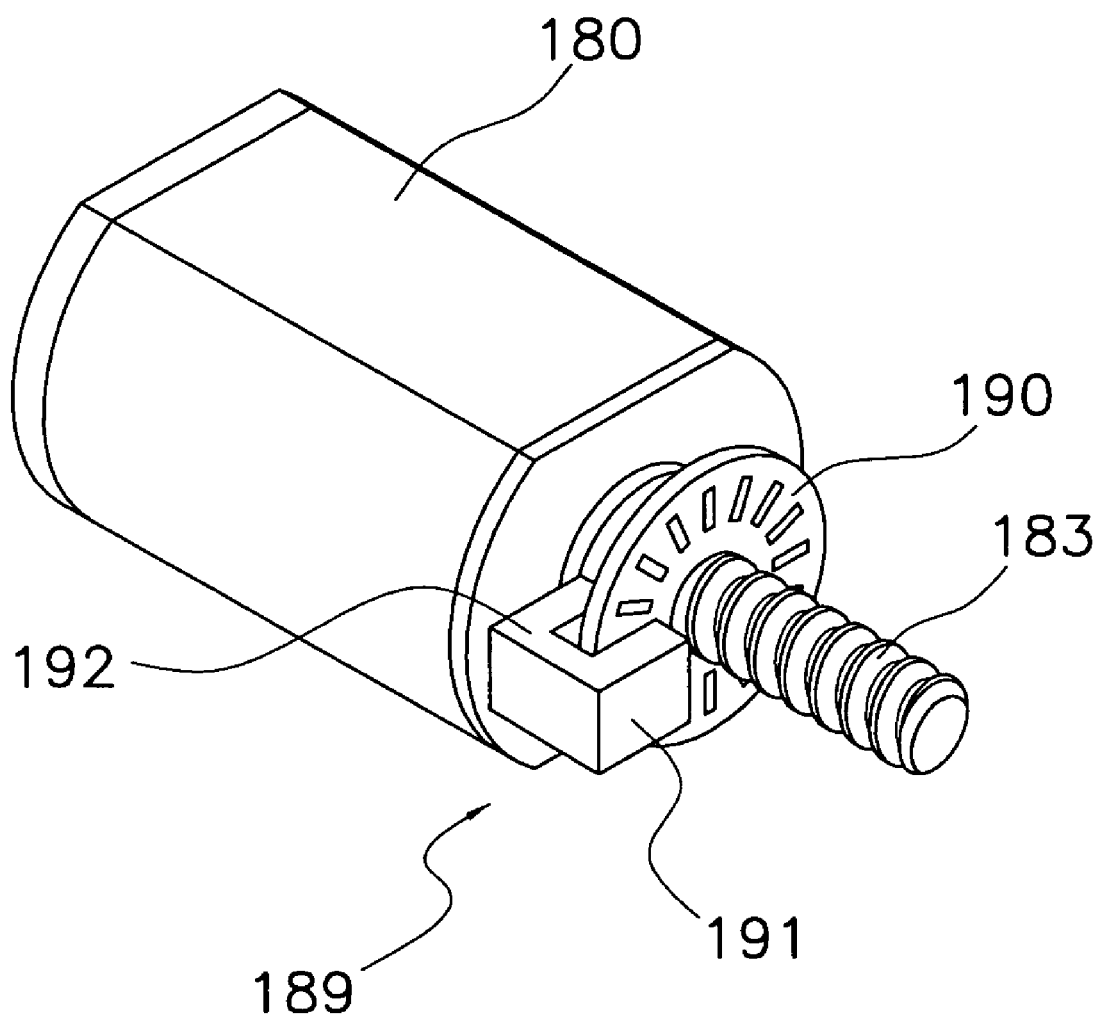
FIG. 46 is a perspective view of the rear derailleur motor unit with the digital position sensor.
Figure 47:
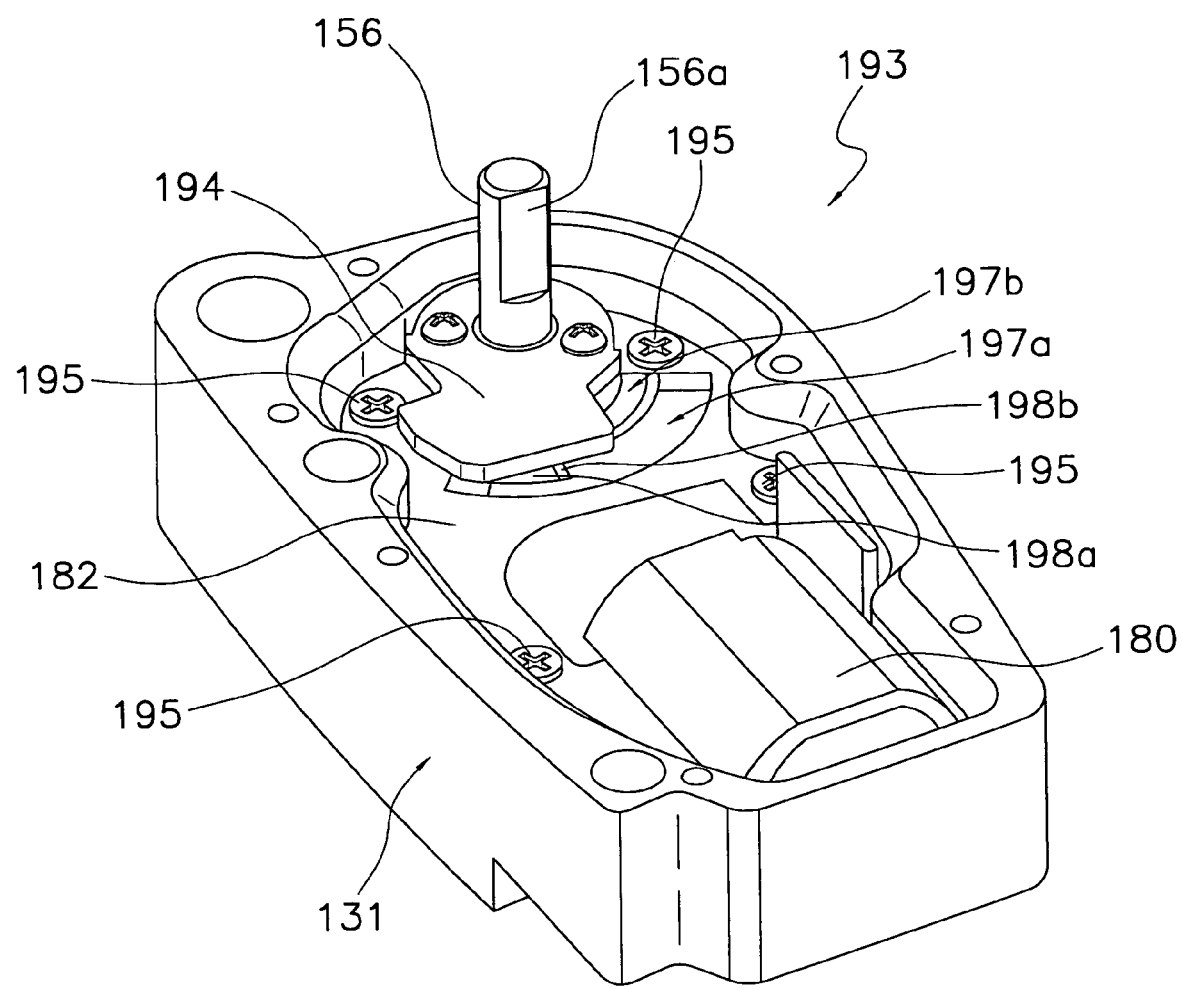
FIG. 47 is a perspective view of the rear derailleur motor unit showing the analog position sensor.
Figure 48:
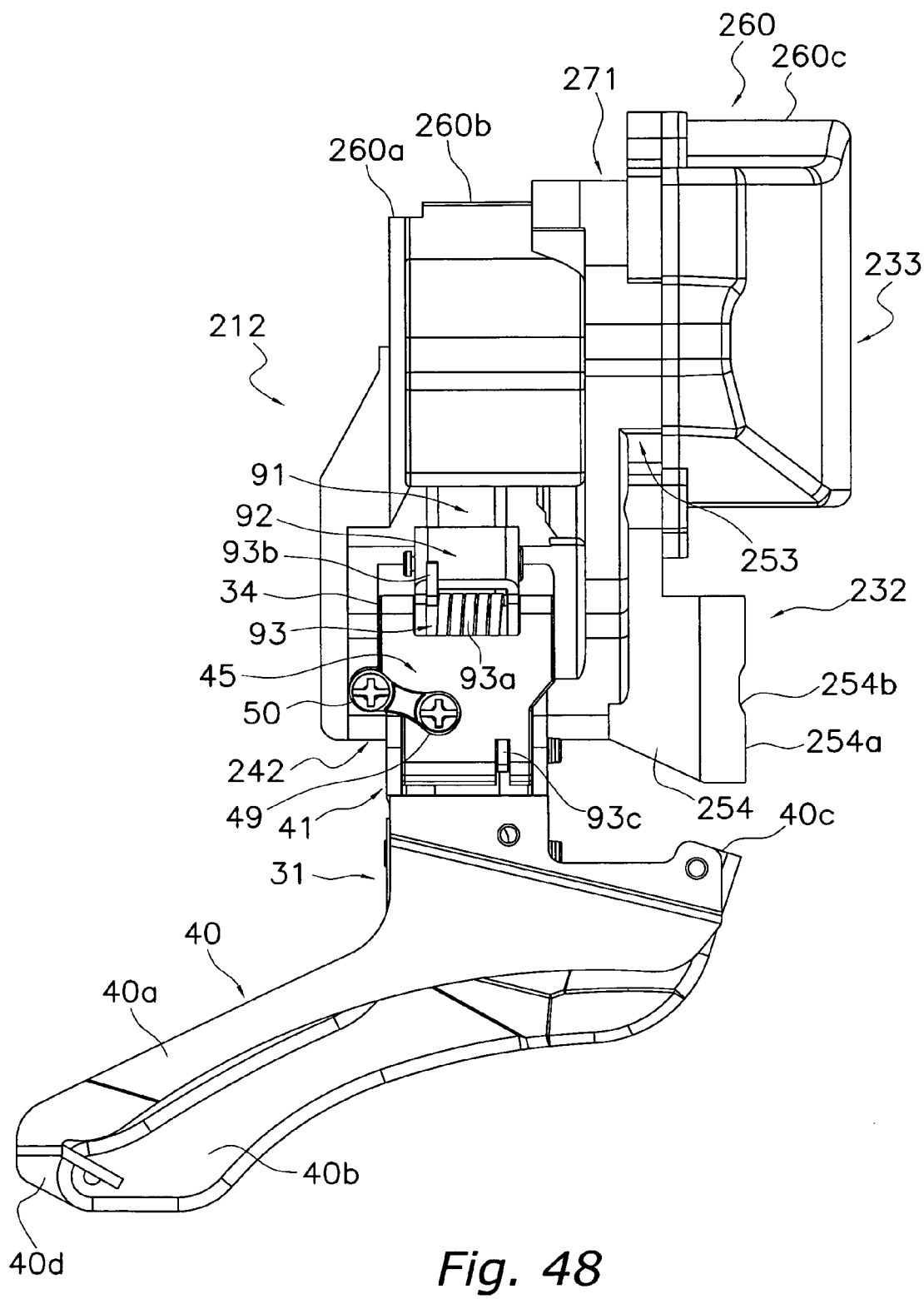
FIG. 48 is an enlarged side elevational view of a motorized front derailleur in accordance with a second embodiment of the present invention.

The rear derailleur 13 further comprises link members 150 and 152 pivotally coupled to the rear derailleur control housing 131 through respective pivot shafts 154 and 156, wherein the link member 152 is non-rotatably fixed to the pivot shaft 156 by a flat 156a (FIG. 47). The pivot shaft 156 is but one example of a derailleur moving member that moves with the rear derailleur 13. The other ends of link members 150 and 152 are pivotally coupled to a movable member 158 through respective the pivot shafts 160 and 162. The movable member 158 rotatably supports a chain guide 164 which, in turn, rotatably supports a guide pulley 166 and a tension pulley 168 for engaging the chain C in a known manner. As discussed in more detail below, a rear derailleur motor 180 (FIGS. 45-47) rotates the pivot shaft 156 for causing the link member 152 to move the movable member 158 and the chain guide 164 laterally for transferring chain C among the plurality of rear sprockets $G_1$-$G_7$.

Figure 45:
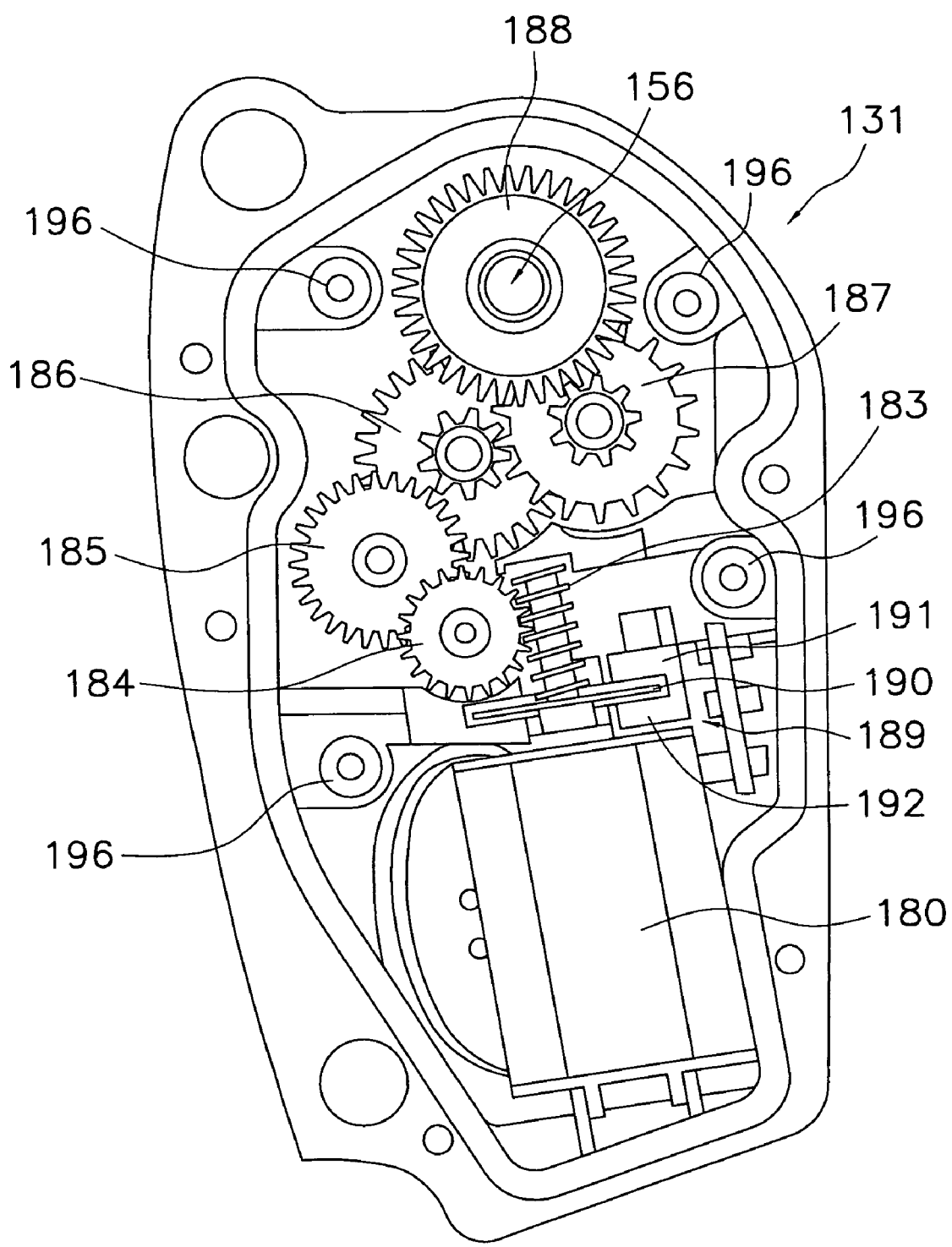
FIG. 45 is an inside elevational view of the rear derailleur motor unit illustrated in FIG. 43 and 44 with portions removed.

FIG. 45 is a view illustrating the contents of the rear derailleur control housing 131 with the rear derailleur control housing cover 140 as well as a contact plate 182 removed, as discussed below. As shown in FIG. 45, the rear derailleur motor 180 includes a pinion drive shaft 183 that drives pivot shaft 156 through a gear reduction mechanism comprising gears 184, 185, 186, 187 and 188, wherein a small diameter gear portion of each gear 184, 185, 186 and 187 drives a larger diameter gear portion of the next gear in the power transmission path. The gear 188 rotates integrally with the pivot shaft 156.

A digital signal providing mechanism in the form of a digital position sensor 189 is mounted in the rear derailleur control housing 131. As shown in FIGS. 45 and 46, the digital position sensor 189 includes a position sensor element or shutter wheel 190 that rotates integrally with the pinion drive shaft 183, a light source or LED 191 disposed on one side of the shutter wheel 190, and a light detector such as a phototransistor 192 disposed on the other side of the shutter wheel 190. Rotation of the shutter wheel 190 with the pinion drive shaft 183 causes the passage of light of LED 191 to phototransistor 192 to be intermittently blocked, thus producing a digital signal having a period determined by the rate of rotation of the shutter wheel 190. Thus, the shape of the digital signal typically will have square or rectangular saw tooth configuration depending upon the operation condition. Thus, digital position sensor 189 functions as an intermittent optical sensor in this embodiment.

As shown in FIG. 47, an analog signal providing mechanism in the form of an analog position sensor 193 also is mounted in rear derailleur control housing 131. Analog position sensor 193 comprises a contact plate 182 and a brush plate 194. The contact plate 182 is mounted to the rear derailleur control housing 131 by screws 195 that screw into threaded openings 196 (FIG. 45), and it includes resistive contacts 197a and 197b. The brush plate 194 rotates integrally with pivot shaft 156, and it includes brushes 198a and 198b for contacting resistive contacts 197a and 197b to operate like a potentiometer in a known manner.

The calibration and shifting movements of the motorized rear derailleur 13 are controlled by the controller 20 of the first embodiment. In other words, in calibrating the motorized rear derailleur 13, the flow chart of FIG. 9 and the schematic block of the overcurrent in FIG. 10 are used to control the motorized rear derailleur 13 during the initial calibration of the motorized rear derailleur 13 by the controller 20.

Second Embodiment

Referring now to FIGS. 48-82, a motorized front derailleur 212 in accordance with a second embodiment will now be explained. Basically, the motorized front derailleur 212 is identical to the motorized front derailleur 12, as discussed above, except that the motorized front derailleur mounting member 32 and the front derailleur motor mounting unit 33 of the first embodiment have been replaced with a modified motorized front derailleur mounting member 232 and a modified front derailleur motor unit 233. In other words, all other parts of the front motorized derailleur 212 are identical to the motorized front derailleur 12 of the first embodiment, except for the modified motorized front derailleur mounting member 232 and the modified front derailleur motor unit 233. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The motorized front derailleur 212 of the second embodiment replaces the motorized front derailleur 12 as seen in FIG. 8. Thus, the calibration and shifting movements of the motorized front derailleur 212 are controlled by the controller 20 of the first embodiment. In other words, in calibrating the motorized front derailleur 212, the flow chart of FIG. 9 and the schematic block of the overcurrent in FIG. 10 are used to control the motorized front derailleur 212 during the initial calibration of the motorized front derailleur 212 by the controller 20.

As best seen in FIGS. 52-55, the motorized front derailleur mounting member 232 basically includes a bicycle frame mounting portion 251, a front derailleur mounting portion 252 and a motor unit mounting portion 253 that includes an integrated front derailleur motor casing 271. The bicycle frame mounting portion 251, the front derailleur mounting portion 252 and the motor unit mounting portion 253 are integrally formed as a one-piece, unitary member together with the front derailleur motor casing 271. The front derailleur mounting portion 252 and the motor unit mounting portion 253 form a derailleur motor support structure.

The bicycle frame mounting portion 251 is configured and arranged to be coupled to the seat tube 16 of the bicycle frame 14 by the bracket 18 in the same manner as the first embodiment. The bicycle frame mounting portion 251 includes a projection 254 that projects outwardly from a first side of the motorized front derailleur mounting member 232 to a free end that forms a curved front surface 254a with a threaded hole 254b. The curved front surface 254a is configured and arranged to contact a corresponding curved portion of the bracket 18 such that the motorized front derailleur mounting member 232 cannot rotated relative to the bracket 18.

The front derailleur mounting portion 252 is configured and arranged to be coupled to the derailleur linkage 41 of the front derailleur unit 31 in the same manner as the first embodiment, as discussed above. In particular, the front derailleur mounting portion 252 has first and second link supporting parts 252a and 252b that are configured and arranged to define a link receiving space therebetween for receiving the first and second links 45 and 46. Thus, the first and second link supporting parts 252a and 252b are configured and arranged to form the front derailleur fixing body 242. The first and second link supporting parts 252a and 252b each include a first pivot pin mounting hole 252c forming the first pivot axis of the first fixed pivot point $P_3$ and a second pivot pin mounting hole 252d forming the second fixed pivot point $P_4$. The first and second link supporting parts 252a and 252b are configured and arranged such that the first and second link supporting parts 252a and 252b are spaced different at the first pivot pin mounting holes 252c than at the second pivot pin mounting holes 252d to accommodate the different sizes of the first and second links 45 and 46. The first pivot axis of the second pivot pin mounting holes 252d passes through the threaded hole 254b as best seen in FIG. 53.

The motor unit mounting portion 253 is configured and arranged to be coupled to the front derailleur motor unit 233. The motor unit mounting portion 253 has cup shaped portion that forms the front derailleur motor casing 271. The motor unit mounting portion 253 has an output shaft opening 253b that has a center axis that is substantially parallel to the pivot axes of the first and second fixed pivot points of the front derailleur mounting portion 252. The motor unit mounting portion 253 further includes various mounting holes for securing the parts of the front derailleur motor unit 233 thereto.

Figure 74:
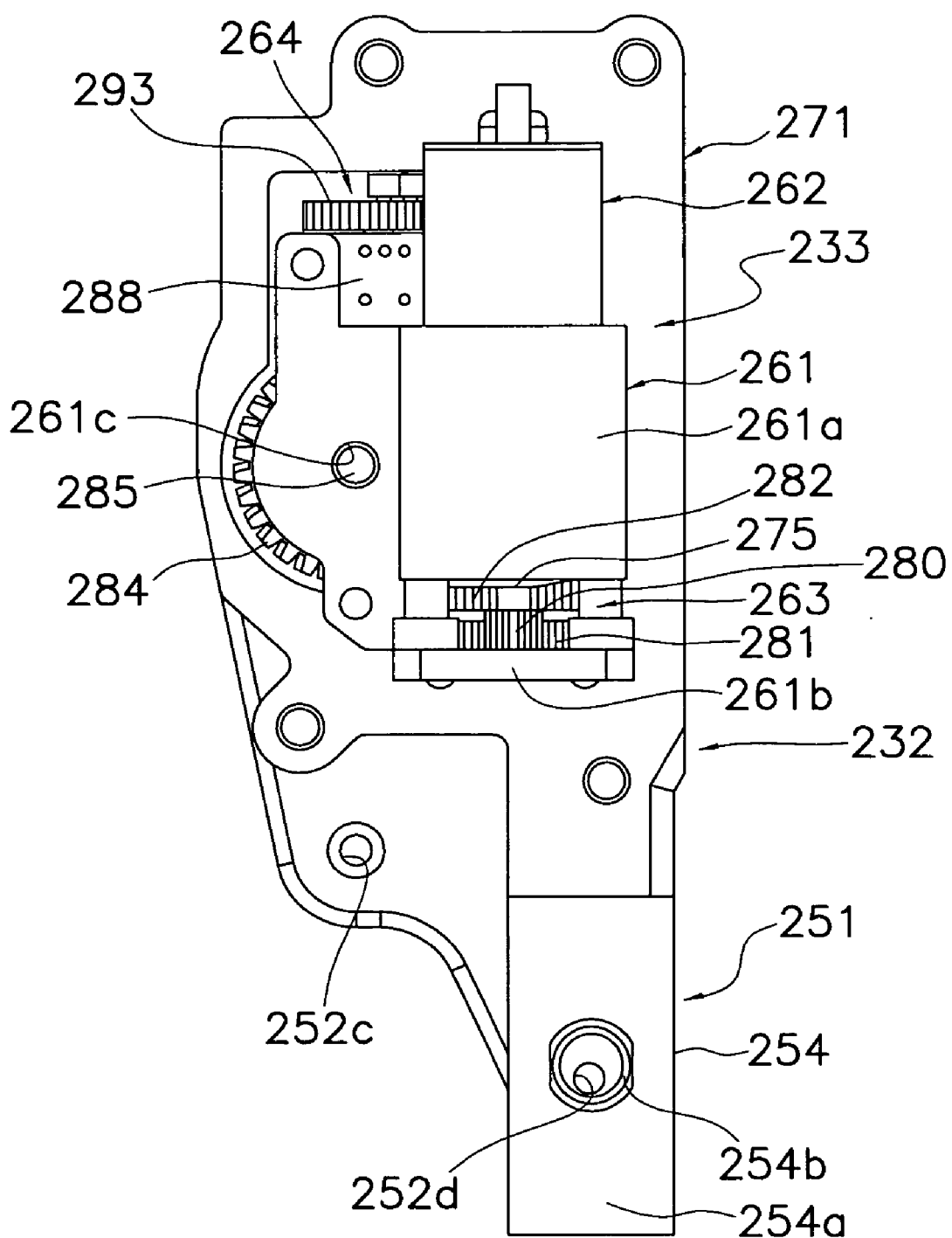
FIG. 74 is a front elevational view of the motor unit mounted in the motorized front derailleur mounting member in accordance with the second embodiment of the present invention.
Figure 75:
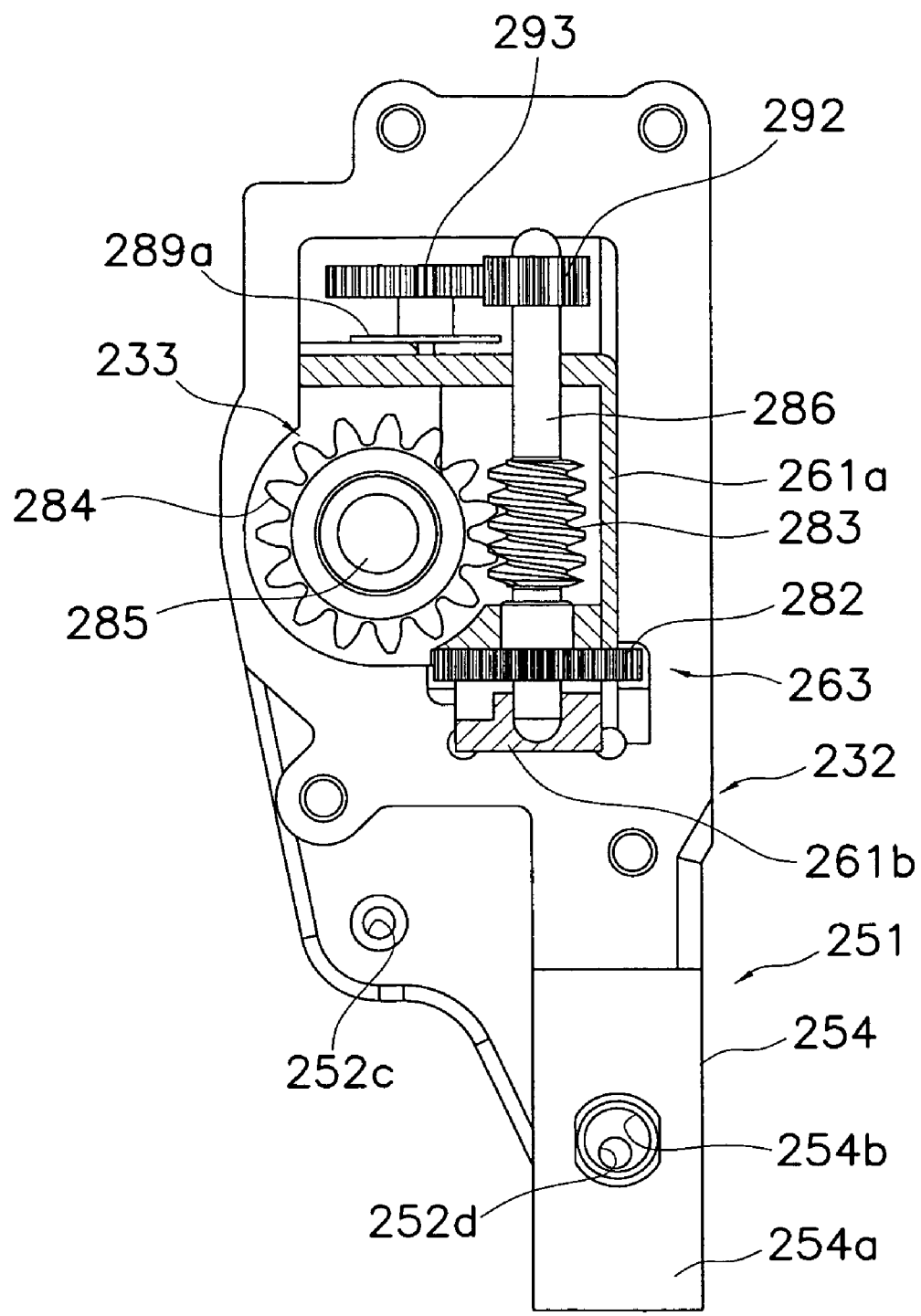
FIG. 75 is a front elevational view of the motor unit mounted in the motorized front derailleur mounting member in accordance with the second embodiment of the present invention with portions of the support structure for the motor unit broken away for purposes of illustration.

Now referring to FIGS. 56-82, the various parts of the front derailleur motor unit 233 will be discussed in more detail. The front derailleur motor unit 233 is designed to be mounted to the casing 271 of the motorized front derailleur mounting member 232. As seen in FIG. 74, the front derailleur motor unit 233 basically includes a motor unit cover structure 260, a derailleur motor support structure 261, a derailleur motor 262, a motor drive train 263 and a position control mechanism or device 264. The front derailleur motor unit 233 is operatively coupled to the chain guide 40 by the motor linkage 34 and the derailleur linkage 41 in the same manner as the first embodiment. Thus, operation of the front derailleur motor unit 233 by the controller 20 causes the chain guide 40 to be shifted between below and top shift positions.

The motor unit cover structure 260 of the front derailleur motor unit 233 basically includes a rear cover 260a (FIGS. 56-59), an intermediate cover 260b (FIGS. 60-64), and a front cover 260c (FIGS. 65-68). The parts of the motor unit cover structure 260 are constructed of rigid materials such as a hard rigid plastic or a metal. The rear cover 260a, the intermediate cover 260b, and the front cover 260c are fixedly coupled to the casing 271 by fasteners (not shown). The rear cover 260a is preferably made of metal, and has an output shaft receiving bore 260c that receives a bearing 265. The precise structures of the rear cover 260a, the intermediate cover 260b, and the front cover 260c are not important to the present invention, and thus, they will not be discussed in detail herein.

Figure 76:
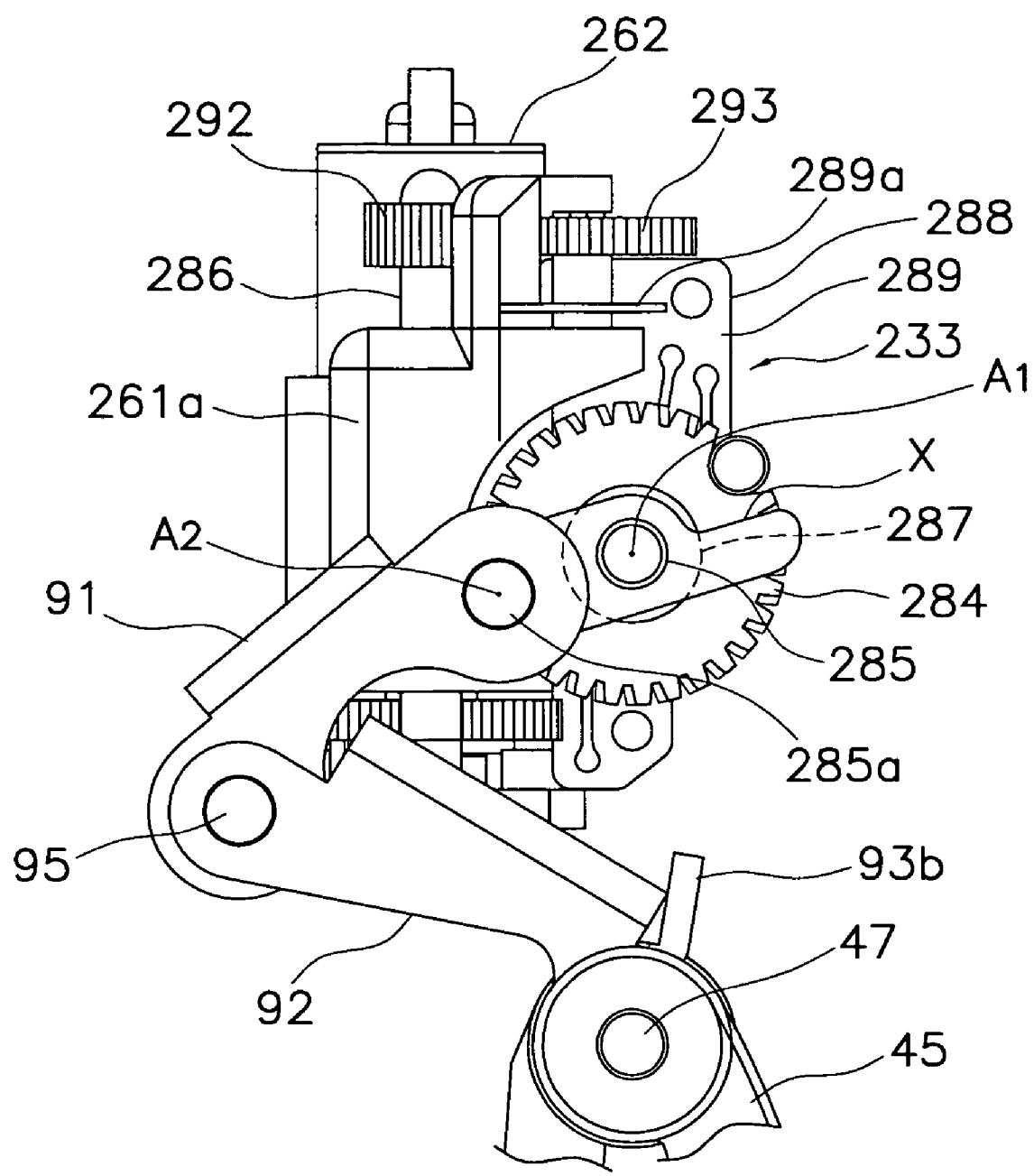
FIG. 76 is a rear elevational view of the connection between the motor unit and the motor linkage in accordance with the second embodiment of the present invention with portions of the support structure for the motor unit broken away for purposes of illustration.
Figure 77:
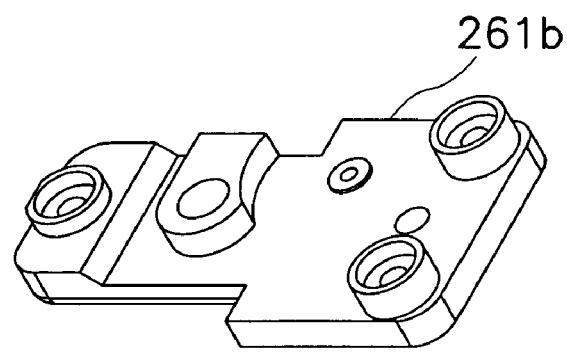
FIG. 77 is a top perspective view of the bottom gear support in accordance with the second embodiment of the present invention.
Figure 78:
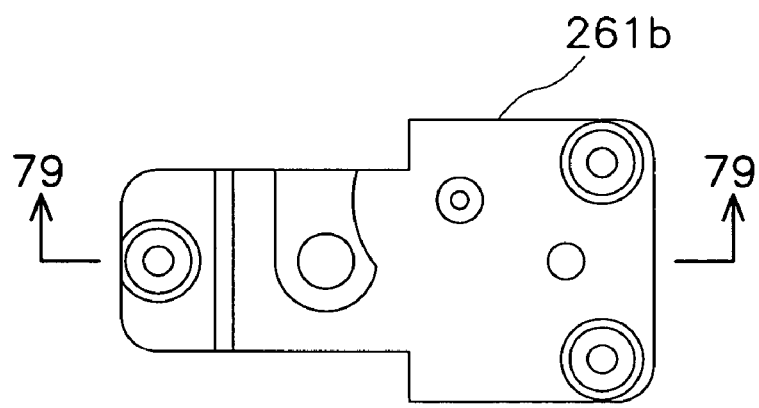
FIG. 78 is a top plan view the bottom gear support in accordance with the second embodiment of the present invention.
Figure 79:
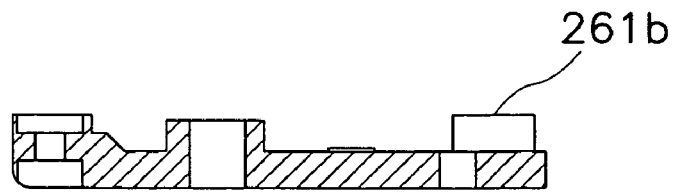
FIG. 79 is a cross sectional view of the bottom gear support in accordance with the second embodiment of the present invention as seen along section line 79-79 of FIG. 78.

As seen in FIGS. 74-79, the derailleur motor unit support 261 is configured and arranged to enclose and support the derailleur motor 262 and the motor drive train 263. The derailleur motor unit support 261 in the illustrated embodiment includes a main support 261a (FIGS. 74 and 76) and a bottom gear support 261b (FIGS. 77-79). Preferably, the main support 261a and the bottom gear support 261b of the derailleur motor unit support 261 are constructed of rigid, light weight materials such as a hard plastic. The main support 261a is configured and arranged to support the derailleur motor 262, the motor drive train 263 and the position control mechanism 264.

Figure 69:
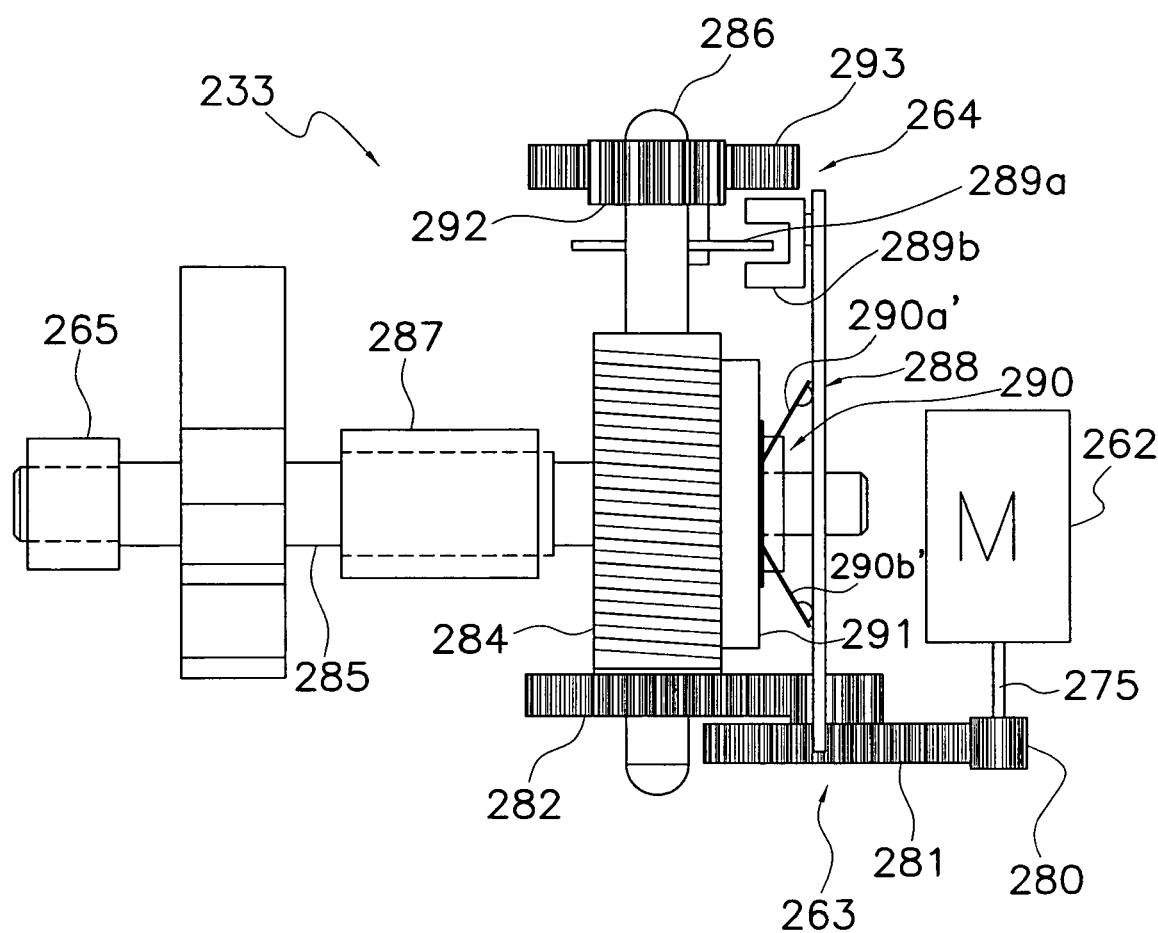
FIG. 69 is a diagrammatic view of the drive train coupled between the motor and the output shaft in accordance with the second embodiment of the present invention.

As seen in FIGS. 69 and 74, the derailleur motor 262 has a drive shaft 275 that is operatively coupled to the motor drive train 263. The derailleur motor 262 is a reversible electrical motor that is powered by a battery source or a generator. The derailleur motor 262 is electrically coupled to the controller 20 by an electrical cord and to a power source (battery source or a generator) by another electrical cord.

As seen in FIGS. 69 and 74-76, the motor drive train 263 basically includes a driving gear 280, a first intermediate gear 281, a second intermediate gear 282, a worm gear 283 and an output gear 284. The output gear 284 is mounted on an output shaft 285. The motor drive train 283 transmits rotational movement of the driving shaft 275 of the derailleur motor 262 to the motor linkage 34 by the output shaft 285. In this embodiment, the gears 280-284 are all constructed of a metal material.

In this embodiment, the driving gear 280 is mounted on the driving shaft 275 of the derailleur motor 262, with the teeth of the driving gear engaged with a first set of teeth of the first intermediate gear 281. The first intermediate gear 281 has a second set of teeth that engage a first set of teeth of the second intermediate gear 282. The second intermediate gear 282 and the worm gear 283 are mounted on an intermediate driven shaft 286. Thus, rotation of the second intermediate 282 causes the worm gear 283 to rotate therewith. The worm gear 283 has a spiral tooth that is engaged with the output gear 284 to rotate the output shaft 285.

Figure 49:
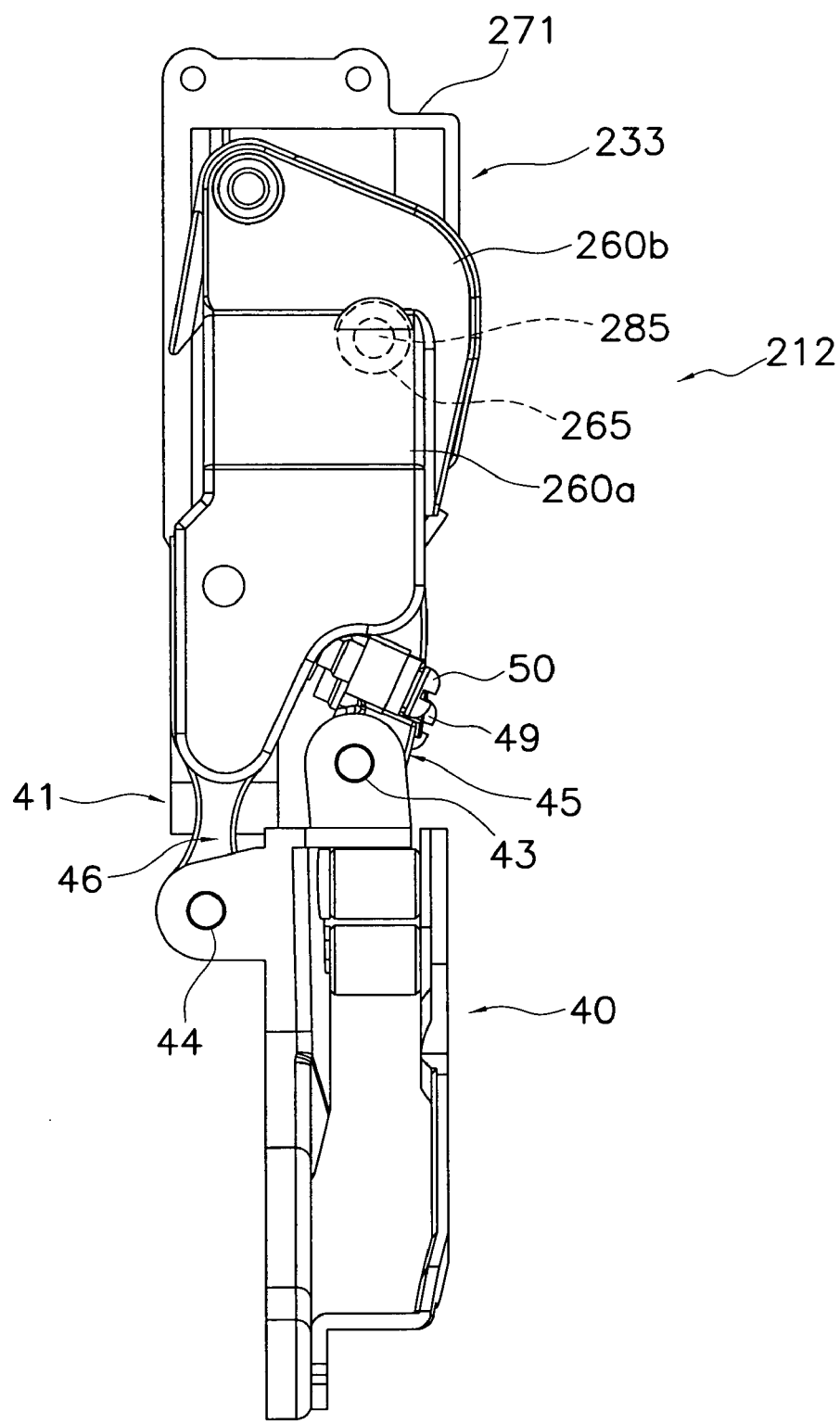
FIG. 49 is an enlarged, rear elevational view of the motorized front derailleur illustrated in FIG. 48 in the low position.
Figure 50:
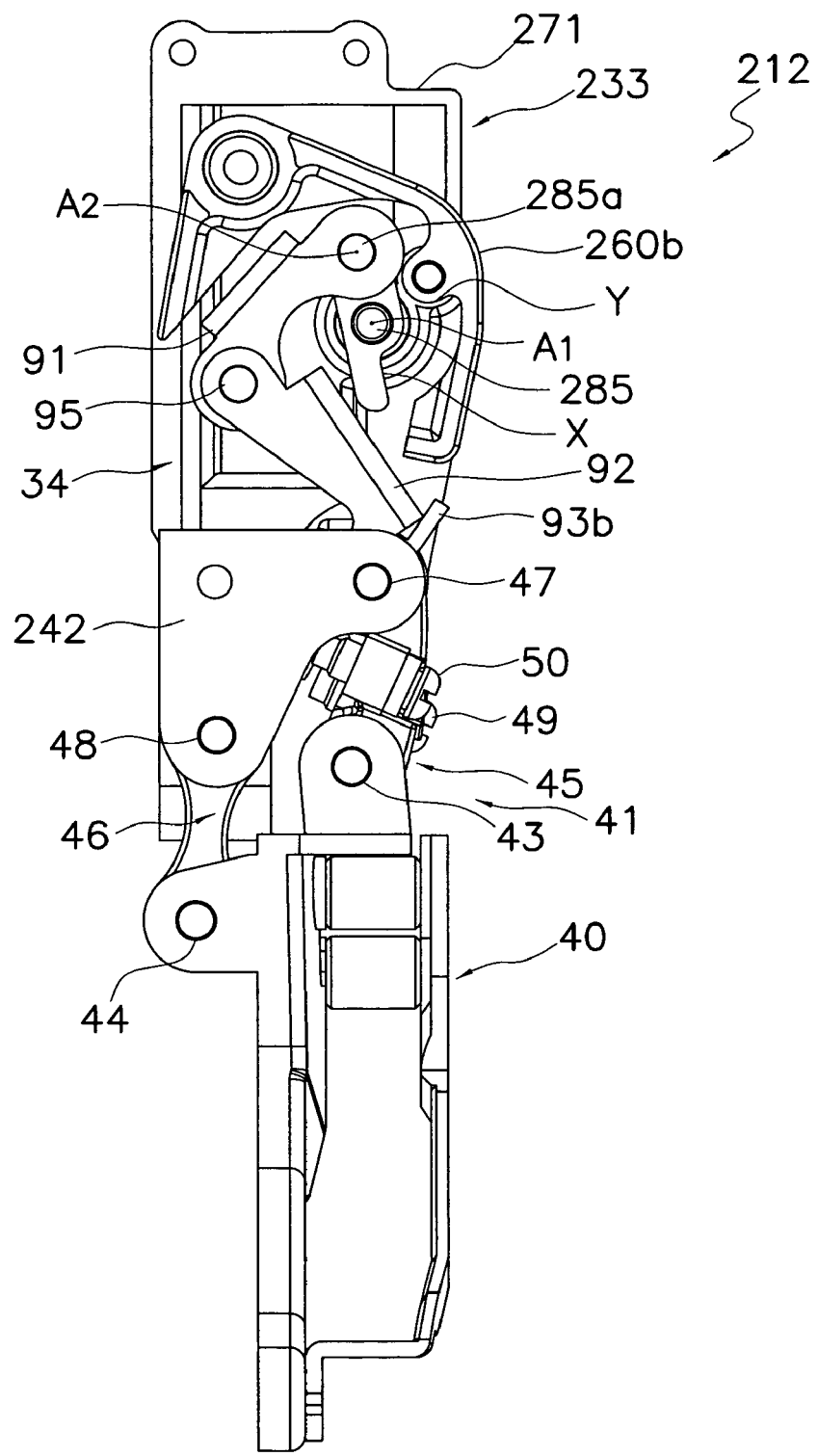
FIG. 50 is an enlarged, rear elevational view of the motorized front derailleur illustrated in FIGS. 48 and 49 in the low position and with the back cover removed.

As seen in FIGS. 49, 74 and 76, the output shaft 285 is rotatably supported at a rear end in the output shaft receiving bore 260c of the rear cover 260a by the bearing 265, at a center portion in the output shaft hole 271d of the casing 271 by a bearing 187 and at a forward end in a hole 261c of the main support 261a. Similar to the first embodiment, the output shaft 285 is configured and arranged to rotate about a rotational axis $A_1$ between a first rotational position and a second rotational position that is opposite the first rotational direction by rotation of the driving shaft 275 of the derailleur motor 262. The output shaft 285 is coupled to the motor or drive link 91 by an eccentric drive pin 285a having an axis $A_2$ that is offset from the rotational axis $A_1$ of the output shaft 285. In this embodiment, the eccentric drive pin 285a is a separate part of the output shaft 285.

Figure 51:
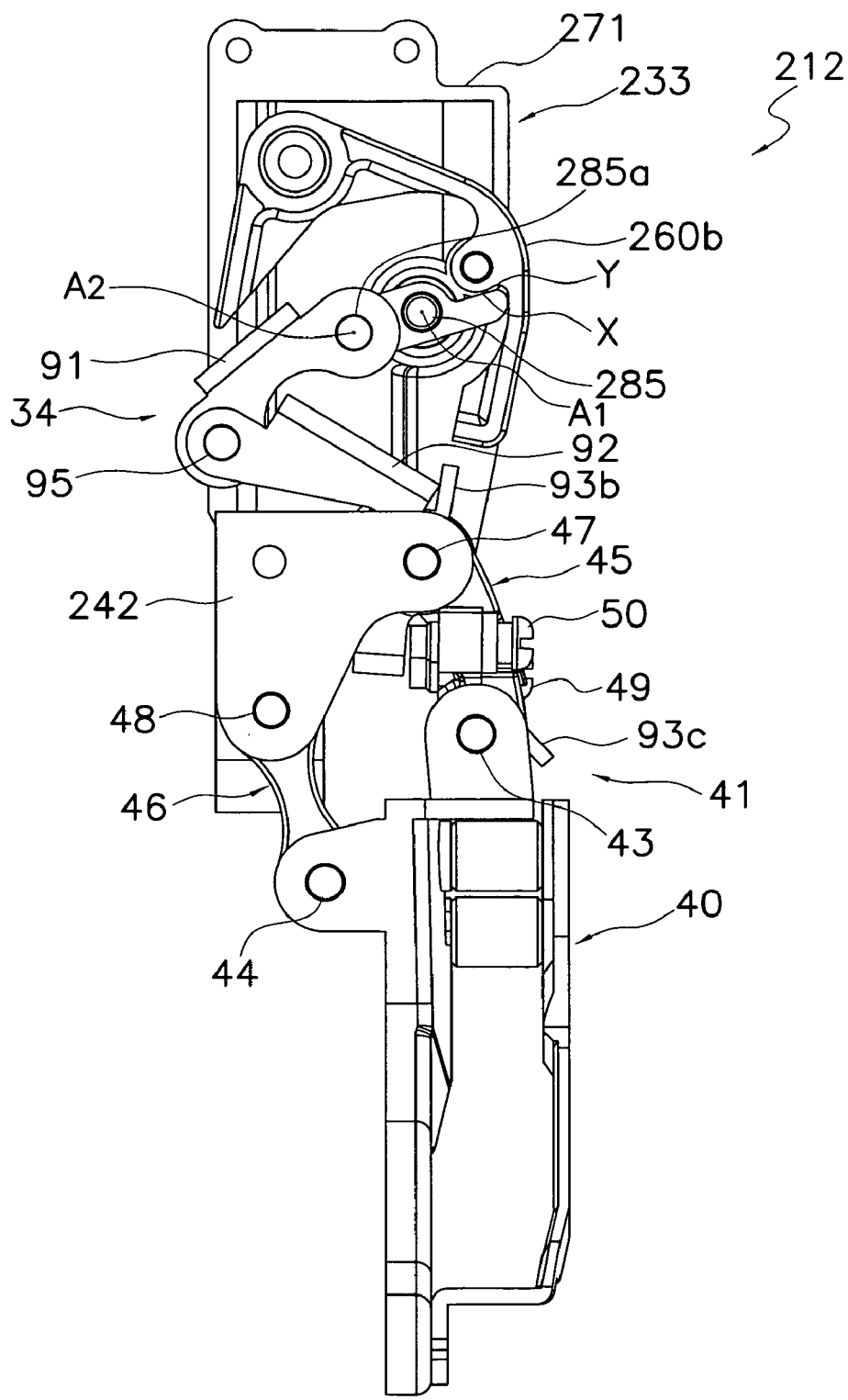
FIG. 51 is an enlarged, rear elevational view of the motorized front derailleur illustrated in FIGS. 48 and 49 in the top position and with the back cover removed.
Figure 65:
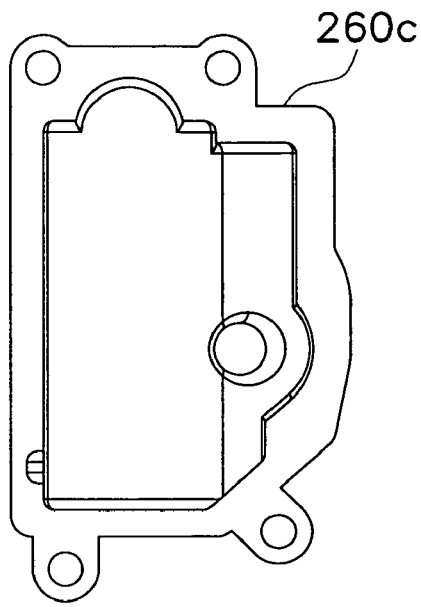
FIG. 65 is a rear elevational view of the front cover in accordance with the second embodiment of the present invention.
Figure 66:
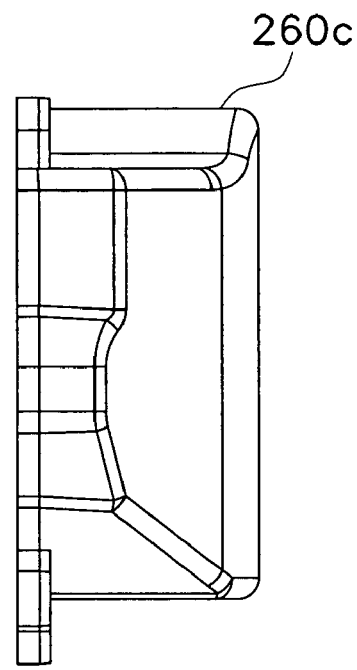
FIG. 66 is a right side elevational view of the front cover in accordance with the second embodiment of the present invention.
Figure 67:
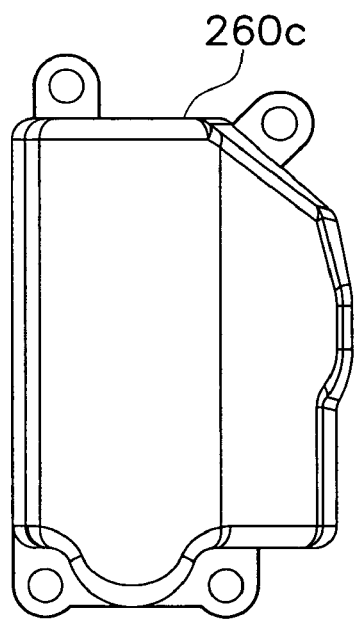
FIG. 67 is a front elevational view of the front cover in accordance with the second embodiment of the present invention.
Figure 68:
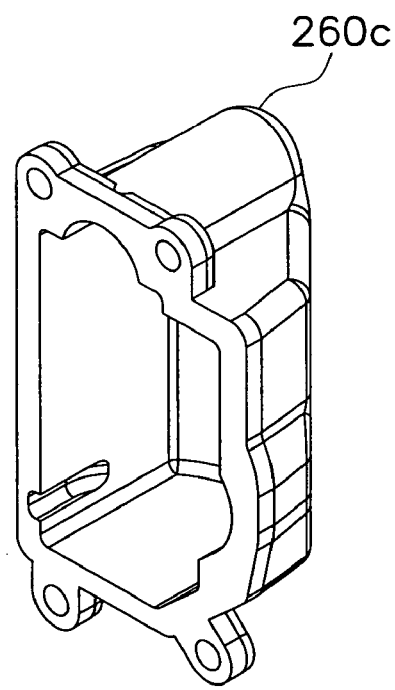
FIG. 68 is a rear perspective view of the front cover in accordance with the second embodiment of the present invention.

The driving gear 292 is mounted on the intermediate driven shaft 286, which has the second intermediate gear 282 and the worm gear 283 mounted thereto. The driving gear 292 has its teeth engaged with the teeth of the position sensor gear 293 such that the driving gear 292 rotates the position sensor gear 293. As mentioned above, the position sensor element 289 is mounted on the position sensor gear 293 such that they rotate together. In the second embodiment, the output shaft has an abutment X that contacts an abutment on the intermediate cover 260b as seen in FIG. 51. When the abutments X and Y are contacting each other, the motor 262 is in its top end position in which an overcurrent occurs. Thus, the derailleur 212 is calibrated such that a new stop position is set to avoid contact between the abutments X and Y using the position control mechanism 264.

Referring now to FIG. 69, the position control mechanism 264 basically includes a printed circuit board 288, a digital signal providing mechanism in the form of a digital position sensor 289 and an analog signal providing mechanism in the form of an analog (top-low brush) position sensor 290. The digital position sensor 289 forms a digital position sensing device, while the analog position sensor 290 forms a mechanical/electrical position sensing device.

The printed circuit board 288 has a plurality of electrical circuits formed thereon in a conventional manner for controlling the operation of the front derailleur motor 262 via the controller 20 in response to signals from the electronic shifters 21 and 22, the digital position sensor 289 and the analog position sensor 290 as well as other sensors as such a wheel rotation sensor and a crank rotation sensor (FIG. 8). The digital position sensor 289 and the analog position sensor 290 are configured and arranged to send digital and analog signals, respectively, to the controller 20 such that the controller 20 controls the electrical current to the front derailleur motor 262.

The digital position sensor 289 is formed by a position sensor element or shutter wheel 289a and a photo interrupter

289b. The angular position of the output shaft 285 is determined by utilizing the shutter wheel 289a and the photo interpreter 289. The shutter wheel 289a is mounted on the position sensor gear 293 such that the shutter wheel 289a rotates therewith. The shutter wheel 289a is provided with a plurality of circumstantially spaced apart openings that are detected by the photo interpreter 289. In other words, the photo interpreter 289 senses the openings in the shutter wheel 289a to determine the relative position of the gear 293. Since the position of the gear 293 directly relates to the position of the output shaft 285, the position of the output shaft 285 can easily be determined. Thus, the controller 20 can determine the position of the chain guide 40 based on the relative position of the gear 293.

The photo interrupter 289b is preferably a dual channel photo interrupter having a light source or LED disposed on one side of the shutter wheel 289a and a light detector such as a phototransistor disposed on the other side of the shutter wheel 289a. Rotation of the shutter wheel 289a by the front derailleur motor 262 causes the passage of light of LED to phototransistor to be intermittently blocked, thus producing a digital signal having a period determined by the rate of rotation of the shutter wheel 289a. Thus, the shape of the digital signal typically will have square or rectangular saw tooth configuration with each of the pulses representing one of a plurality of angular positions of the output shaft 285. Since the photo interrupter 289b has two channels, the two digital signals will be produced by the photo interrupter 289b that are out of phase with each other as shown in FIG. 9. Thus, the digital position sensor 289 functions as an intermittent optical sensor that can detect both the rotational direction and the angular position of the output shaft 285 of the motor drive train 263 of the motor 262. The digital position sensor 289 sends a position signal indicative of an angular position and rotational direction of the output shaft 285 of the motor drive train 263 of the motor 262. In view of the operation of the digital position sensor 289, the analog position sensor 290, which operates like a potentiometer in a known manner, merely acts as an on-off sensor to indicate an edge of the top contact range spaced from the top stop position and an edge of the low contact range spaced from the low stop position.

As seen in FIGS. 69 and 80-82, the analog position sensor 290 includes an electrical contact plate with three stationary electrical contacts 290a, 290b and 290c that are formed on the printed circuit board 288, and two movable electrical brushes 290a' and 290b' that are mounted on the output shaft 285 to rotate therewith via a mounting member 291.

The electrical brushes 290a' and 290b' are coupled in a cantilever fashion to the mounting member 291 with their free ends arranged to selectively contact the electrical contacts 290a, 290b and 290c that are mounted to the printed circuit board 288. In other words, electrical brushes 290a' and 290b' rotate together with the output shaft 285. Thus, the brushes 290a' and 290b' cooperate with the contacts 290a, 290b and 290c to complete an electrical circuit. In particular, the electrical brush 290a' selectively contacts both the contacts 290a and 290b to define the top and low derailleur positions (top and low end gear ranges) of the output shaft 285 from the stops or lockup positions. The electrical brush 290b' contact the ground contact 290c to form a ground connection either while the electrical brush 290a' is contacting either the contact 290a or 290b. When the electrical brush 290a' and the top position contact 290a are contacting each other, an analog or mechanical signal indicating a top position is sent to the controller 20. When the electrical brush 290a' and the top position contact 290a are disengaged, the analog or mechanical signal is stop. Thus, the controller 20 can determine when the output shaft 285 is located at the top derailleur position or top end gear range. Likewise, when the electrical brush 290a' and the low position contact 290b are contacting each other, an analog or mechanical signal is sent indicating a low position to the controller 20. When the electrical brush 290a' and the low position contact 290b are disengaged, the analog or mechanical signal is stop. Thus, the controller 20 can determine when the output shaft 285 is located at the low derailleur position or low end gear range. Of course, the top derailleur position of the chain guide 40 is controlled by the top adjustment screw 49 contacting the motor linkage 34, while the low derailleur position of the chain guide 40 is controlled by the low adjustment screw 50 contacting the motor linkage 34. Because the operation of the digital position sensor 289 indicates both the rotational direction and angular position of the output shaft 285, the analog position sensor 290 merely acts as an on-off sensor to indicate when the electrical brushes 290a' engage or disengage the top and low position contacts 290a and 290b, respectively. More specifically, the controller 20 determines the precise location of the edges of the top and low position contacts 290a and 290b that are spaced from the top and low stop positions, respectively.

Accordingly, the controller 20 is operatively coupled to the front derailleur motor 262 and the position control mechanism 264 to run the program shown by the flow chart in FIG. 9. The controller 20 is configured to detect a predetermined lockup position of the front derailleur motor 262 occurring at the top derailleur shift positions when the abutments X and Y contact each other as seen in FIG. 51. This lockup position is defected by the overcurrent circuit of FIG. 10 in the same manner as the first embodiment. The controller 20 is further configured to set a predetermined stop position for the front derailleur motor 262 that is calculated distance prior to the lockup position based on the position signal of the position control mechanism 264 in the same manner as the first embodiment.

As used herein to describe and claim the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, while the present invention is only illustrated as a front derailleur, it will be apparent to those skilled in the art from this disclosure that the present invention can be incorporated into a rear derailleur. Furthermore, the foregoing descriptions of the embodiments according to the present invention are provided for illustration only, and not for the purpose of limiting the invention as defined by the appended claims and their equivalents.

What is claimed is:

1. An electric derailleur motor unit comprising:
   a derailleur motor;
   an output shaft operatively coupled to the derailleur motor to rotate through a moveable range including a first derailleur shift position and a second derailleur shift position; and
   a position control mechanism configured and arranged to provide a position signal indicative of an angular position of the output shaft; and
   a controller operatively coupled to the derailleur motor and the position control mechanism, the controller being configured to detect a predetermined lockup position of the derailleur motor occurring at one of the first and second derailleur shift positions, and the controller being further configured to set a predetermined stop position for the derailleur motor that is calculated distance prior to the lockup position based on the position signal of the position control mechanism.

2. The electric derailleur motor unit according to claim 1, wherein
   the position control mechanism includes a position sensing device configured to provide a plurality of angular position values corresponding to a plurality of angular positions of the output shaft.

3. The electric derailleur motor unit according to claim 2, wherein
   the position sensing device includes a position sensor element that is configured to move as the output shaft rotates and a photo interrupter that is configured to detect rotation of the position sensor element.

4. The electric derailleur motor unit according to claim 3, further comprising
   a drive train coupled between a driving shaft of the derailleur motor and the output shaft with the position sensor element being operatively coupled to one of the drive train, the driving shaft and the output shaft.

5. The electric derailleur motor unit according to claim 3, wherein
   the derailleur motor is a reversible derailleur motor that is configured and arranged to rotate the output shaft in a first rotational direction and a second rotational direction that is opposite to the first rotational direction, and
   the photo interrupter includes a first channel arranged to produce a first signal and a second channel arranged to produce a second signal that is different from the first signal to indicate rotational direction of the derailleur motor.

6. The electric derailleur motor unit according to claim 1, wherein
   the position control mechanism includes a position sensing device configured to provide an angular position value corresponding to an end gear position.

7. The electric derailleur motor unit according to claim 6, wherein
   the position sensing device includes a potentiometer having an electrical sensor element with a first electrical contact that is configured to move as the output shaft rotates and a first electrical brush that is configured to contact the first electrical contact during movement along a first end gear range that corresponds to one of the first and second derailleur shift positions.

8. The electric derailleur motor unit according to claim 7, wherein
   the potentiometer further includes a second electrical contact disposed on the electrical sensor element that moves as the output shaft rotates and a second electrical brush that is configured to contact the second electrical contact during movement along a second end gear range that corresponds to the other of the first and second derailleur shift positions.

9. The electric derailleur motor unit according to claim 1, wherein
   the position control mechanism includes an overcurrent detecting circuit operatively coupled to a power input line of the derailleur motor to compare voltage in the power input line with a reference voltage to determine when an overcurrent occurs in the derailleur motor due to the derailleur motor reaching the predetermined lockup position.

10. The electric derailleur motor unit according to claim 9, further comprising
    a drive train coupled between a driving shaft of the derailleur motor and the output shaft, and
    one of the drive train, the driving shaft and the output shaft including a movable abutment arranged to contact a second stationary abutment when the output shaft reaches the predetermined lockup position of the derailleur motor.

11. The electric derailleur motor unit according to claim 10, wherein
    the movable abutment is fixed to the output shaft.

12. The electric derailleur motor unit according to claim 1, wherein
    the position control mechanism includes a first position sensing device configured to provide a plurality of angular position values corresponding to a plurality of angular positions of the output shaft, and a second position sensing device configured to provide an angular position value corresponding to an end gear edge position.

13. The electric derailleur motor unit according to claim 12, wherein
    the position control mechanism further includes an overcurrent detecting circuit operatively coupled to a power input line of the derailleur motor to compare voltage in the power input line with a reference voltage to determine when an overcurrent occurs in the derailleur motor due to the derailleur motor reaching the predetermined lockup position.

14. The electric derailleur motor unit according to claim 13, further comprising
    a drive train coupled between a driving shaft of the derailleur motor and the output shaft, and
    one of the drive train, the driving shaft and the output shaft including a movable abutment arranged to contact a second stationary abutment when the output shaft reaches the predetermined lockup position of the derailleur motor.

15. The electric derailleur motor unit according to claim 13, wherein
    the position sensing device includes a position sensor element that is configured to move as the output shaft rotates and a photo interrupter that is configured to detect rotation of the position sensor element.

16. The electric derailleur motor unit according to claim 15, wherein
    the derailleur motor is a reversible derailleur motor that is configured and arranged to rotate the output shaft in a first rotational direction and a second rotational direction that is opposite to the first rotational direction, and
    the photo interrupter includes a first channel arranged to produce a first signal and a second channel arranged to produce a second signal that is different from the first signal to indicate rotational direction of the derailleur motor.

17. The electric derailleur motor unit according to claim 15, wherein
the position sensing device includes a potentiometer having an electrical sensor element with a first electrical contact that is configured to move as the output shaft rotates and a first electrical brush that is configured to contact the first electrical contact during movement along a first end gear range that corresponds to one of the first and second derailleur shift positions.

18. The electric derailleur motor unit according to claim 17, wherein
the potentiometer further includes a second electrical contact disposed on the electrical sensor element that moves as the output shaft rotates and a second electrical brush that is configured to contact the second electrical contact during movement along a second end gear range that corresponds to the other of the first and second derailleur shift positions.

19. The electric derailleur motor unit according to claim 13, wherein
the position sensing device includes a potentiometer having an electrical sensor element with a first electrical contact that is configured to move as the output shaft rotates and a first electrical brush that is configured to contact the first electrical contact during movement along a first end gear range that corresponds to one of the first and second derailleur shift positions.

20. The electric derailleur motor unit according to claim 1, further comprising
a derailleur moving member operatively coupled to the output shaft to move in response to rotation of the output shaft.

21. The electric derailleur motor unit according to claim 20, wherein
the derailleur moving member includes a derailleur linkage operatively coupled to the output shaft to move in response to rotation of the output shaft, and a chain guide movably coupled by the derailleur linkage to move the chain guide between the first and second derailleur shift positions in response to movement of the output shaft.

22. The electric derailleur motor unit according to claim 21, wherein
the derailleur further includes a mechanical adjustment device configured and arranged to change at least one end gear position of the chain guide.

* * * * *